United States Patent
Ford et al.

(10) Patent No.: US 9,175,876 B2
(45) Date of Patent: Nov. 3, 2015

(54) SELF-HEATING SYSTEMS AND METHODS FOR RAPIDLY HEATING A COMESTIBLE SUBSTANCE

(71) Applicant: Heat Wave Technologies, LLC, Marina Del Rey, CA (US)

(72) Inventors: John Ford, Cordova, CA (US); Douglas Lund, Hillsborough, NJ (US)

(73) Assignee: Heat Wave Technologies, LLC, Marina del Rey, CA (US)

( * ) Notice: Subject to any disclaimer, the term of this patent is extended or adjusted under 35 U.S.C. 154(b) by 0 days.

(21) Appl. No.: 14/284,145

(22) Filed: May 21, 2014

(65) Prior Publication Data
US 2014/0331987 A1   Nov. 13, 2014

Related U.S. Application Data

(63) Continuation of application No. 13/750,455, filed on Jan. 25, 2013, now Pat. No. 8,783,244, which is a continuation of application No. 12/400,730, filed on Mar. 9, 2009, now Pat. No. 8,360,048.

(51) Int. Cl.
*F24J 1/00*      (2006.01)
*A47J 36/28*   (2006.01)
(Continued)

(52) U.S. Cl.
CPC .. *F24J 1/00* (2013.01); *A47J 36/28* (2013.01); *B23P 11/00* (2013.01); *B65D 81/3484* (2013.01); *C09K 5/18* (2013.01); *Y10T 29/49826* (2015.01)

(58) Field of Classification Search
CPC ......... A47J 36/28; B65D 81/3484; F24J 1/00; B23P 11/00; C09K 5/18; Y10T 29/49826
See application file for complete search history.

(56) References Cited

U.S. PATENT DOCUMENTS

| 827,222 A | 7/1906 | Espenhayn et al. |
| 1,971,364 A | 8/1934 | Zimmer et al. |

(Continued)

FOREIGN PATENT DOCUMENTS

| CA | 2 235 678 | 5/1997 |
| CA | 2235678 | * 1/2000 |

(Continued)

OTHER PUBLICATIONS

"HeatUp Food Warming Ware by Exotherm"—Power Point Presentation, (http//www.rearch.smu.edu.sg/faculty/twc/TWC2005/entries.html), Aug. 4, 2005, pp. 1-34.

(Continued)

*Primary Examiner* — Alfred Basichas
(74) *Attorney, Agent, or Firm* — Knobbe, Martens, Olson & Bear, LLP

(57) ABSTRACT

Self-heating containers comprise a reaction chamber and a heating chamber. The heating chamber is sized to contain a substance to be heated. The reaction chamber contains reactants which, when contacted, exothermically react. The reaction chamber is divided into a first compartment and a second compartment with a barrier therebetween. The barrier comprises a first barrier portion and a second barrier portion. The first barrier portion is attached to a reaction chamber wall and has an opening sized to allow reactants to flow through from one compartment to the other. The second barrier portion is attached to the first barrier portion to close the opening. The barrier can be opened by moving an actuator into engagement with the second barrier portion to dislodge the second barrier portion from the first barrier portion and thereby open the barrier.

20 Claims, 10 Drawing Sheets

(51) Int. Cl.
*B65D 81/34* (2006.01)
*C09K 5/18* (2006.01)
*B23P 11/00* (2006.01)

(56) References Cited

U.S. PATENT DOCUMENTS

| | | | |
|---|---|---|---|
| 2,142,852 A | 1/1939 | Lacy | |
| 2,300,793 A | 11/1942 | Martin | |
| 2,482,779 A | 9/1949 | Katz | |
| 2,556,893 A | 10/1949 | Katz | |
| 2,620,788 A | 12/1952 | Rivoche et al. | |
| 3,003,324 A | 10/1961 | Vance et al. | |
| 3,213,932 A | 10/1965 | Gottfurcht et al. | |
| 3,229,478 A | 1/1966 | Alonso | |
| 3,369,369 A | 2/1968 | Weiss | |
| 3,429,672 A | 2/1969 | Young | |
| 3,561,424 A | 2/1971 | Failla | |
| 3,653,372 A | 4/1972 | Douglas | |
| 3,675,637 A | 7/1972 | Trimble | |
| 3,683,889 A | 8/1972 | Hoffman | |
| 3,685,507 A | 8/1972 | Donnelly | |
| 3,874,557 A | 4/1975 | Porter | |
| 3,970,068 A | 7/1976 | Sato | |
| 4,439,416 A | 3/1984 | Cordon et al. | |
| 4,528,218 A | 7/1985 | Maione | |
| 4,559,921 A | 12/1985 | Benmussa | |
| 4,640,264 A | 2/1987 | Yamaguchi et al. | |
| 4,741,324 A | 5/1988 | Ina et al. | |
| 4,751,119 A | 6/1988 | Yukawa | |
| 4,752,310 A | 6/1988 | Maier-Laxhuber et al. | |
| 4,753,085 A | 6/1988 | Labrousse | |
| 4,762,113 A | 8/1988 | Hamasaki | |
| 4,773,389 A | 9/1988 | Hamasaki | |
| 4,779,609 A | 10/1988 | Oblon | |
| 4,784,113 A | 11/1988 | Nagai et al. | |
| 4,784,678 A | 11/1988 | Rudick et al. | |
| 4,793,323 A | 12/1988 | Guida et al. | |
| 4,802,343 A | 2/1989 | Rudick et al. | |
| 4,823,769 A | 4/1989 | Semaan | |
| 4,838,242 A | 6/1989 | Oblon | |
| 4,895,135 A | 1/1990 | Hamasaki | |
| 4,928,495 A | 5/1990 | Siegel | |
| 4,989,729 A | 2/1991 | Huang | |
| 4,993,237 A | 2/1991 | Bond et al. | |
| 5,168,708 A | 12/1992 | Siegel | |
| 5,197,302 A | 3/1993 | Sabin et al. | |
| 5,220,909 A | 6/1993 | Pickard et al. | |
| 5,230,216 A | 7/1993 | Siegel | |
| 5,255,812 A | 10/1993 | Hsu | |
| 5,263,991 A | 11/1993 | Wiley et al. | |
| 5,388,565 A | 2/1995 | Ou | |
| 5,392,762 A | 2/1995 | Hsu | |
| 5,461,867 A | 10/1995 | Schudder et al. | |
| 5,465,707 A | 11/1995 | Fulcher et al. | |
| 5,626,022 A | 5/1997 | Schudder et al. | |
| 5,628,304 A | 5/1997 | Freiman | |
| 5,809,786 A | 9/1998 | Schudder et al. | |
| 5,979,164 A | 11/1999 | Schudder et al. | |
| 5,993,854 A | 11/1999 | Needleman et al. | |
| 6,065,300 A | 5/2000 | Anthony | |
| 6,079,405 A | 6/2000 | Justo | |
| 6,103,280 A | 8/2000 | Molzahn et al. | |
| 6,105,384 A | 8/2000 | Joseph | |
| 6,123,065 A | 9/2000 | Teglbjarg | |
| 6,141,970 A | 11/2000 | Molzahn et al. | |
| 6,178,753 B1 | 1/2001 | Scudder et al. | |
| 6,234,165 B1 | 5/2001 | Creighton et al. | |
| 6,253,440 B1 | 7/2001 | Chen | |
| 6,266,879 B1 | 7/2001 | Scudder et al. | |
| 6,338,252 B1 | 1/2002 | Calderaio | |
| 6,341,602 B1 * | 1/2002 | Fulcher | 126/263.07 |
| 6,351,953 B1 | 3/2002 | Scudder et al. | |
| 6,481,214 B2 | 11/2002 | Peters et al. | |
| 6,484,514 B1 | 11/2002 | Joseph | |
| 6,502,407 B1 | 1/2003 | Searle et al. | |
| 6,513,516 B2 | 2/2003 | Sabin et al. | |
| 6,564,558 B1 | 5/2003 | Seymour | |
| D478,511 S | 8/2003 | Reynolds | |
| 6,601,577 B2 | 8/2003 | Bouskila | |
| 6,622,882 B2 | 9/2003 | Smith | |
| 6,644,383 B2 | 11/2003 | Joseph | |
| 6,705,309 B2 | 3/2004 | Searle et al. | |
| 6,763,960 B2 | 7/2004 | Oh | |
| 6,829,902 B1 | 12/2004 | Claydon | |
| 6,877,504 B2 | 4/2005 | Schreff et al. | |
| 6,986,435 B2 | 1/2006 | Sagal et al. | |
| 7,004,161 B2 | 2/2006 | Kolb | |
| 7,021,064 B2 | 4/2006 | Wohland et al. | |
| 7,025,055 B2 | 4/2006 | Scudder et al. | |
| 7,107,783 B2 | 9/2006 | Smolko et al. | |
| 7,117,684 B2 | 10/2006 | Scudder et al. | |
| 7,118,005 B2 | 10/2006 | Shimazaki | |
| 7,150,354 B2 | 12/2006 | Snell | |
| 7,213,401 B2 * | 5/2007 | Jeuch et al. | 62/60 |
| 7,240,507 B2 | 7/2007 | Jeuch | |
| 8,001,959 B2 | 8/2011 | Ford et al. | |
| 8,360,048 B2 | 1/2013 | Ford et al. | |
| 8,578,926 B2 | 11/2013 | Ford et al. | |
| 8,783,244 B2 | 7/2014 | Ford et al. | |
| 2001/0039947 A1 | 11/2001 | Searle | |
| 2002/0017291 A1 | 2/2002 | Searle et al. | |
| 2002/0117163 A1 | 8/2002 | Searle | |
| 2002/0129610 A1 | 9/2002 | Searle | |
| 2002/0159247 A1 | 10/2002 | Katzman | |
| 2002/0162549 A1 | 11/2002 | Kolb | |
| 2003/0000517 A1 | 1/2003 | Joseph et al. | |
| 2003/0038140 A1 | 2/2003 | Sagal et al. | |
| 2003/0205224 A1 | 11/2003 | Kolb | |
| 2004/0112367 A1 | 6/2004 | Zaninelli | |
| 2005/0155599 A1 | 7/2005 | Maxwell et al. | |
| 2005/0160743 A1 | 7/2005 | Dunwoody | |
| 2005/0198969 A1 | 9/2005 | Scudder et al. | |
| 2006/0086097 A1 * | 4/2006 | Guida | 62/4 |
| 2006/0118103 A1 | 6/2006 | Schreff et al. | |
| 2006/0137535 A1 | 6/2006 | Searle | |
| 2006/0162344 A1 | 7/2006 | Scudder et al. | |
| 2006/0169276 A1 | 8/2006 | Scudder et al. | |
| 2006/0186125 A1 | 8/2006 | Tew | |
| 2006/0191272 A1 | 8/2006 | Wohland et al. | |
| 2006/0191283 A1 | 8/2006 | Overgaard | |
| 2006/0196882 A1 | 9/2006 | Shimazaki et al. | |
| 2006/0201165 A1 | 9/2006 | Martino et al. | |
| 2006/0213205 A1 | 9/2006 | Reverendo | |
| 2006/0248910 A1 | 11/2006 | Smolko et al. | |
| 2006/0260326 A1 | 11/2006 | Hickey | |
| 2006/0283194 A1 | 12/2006 | Flanagan | |
| 2006/0289565 A1 | 12/2006 | Manzo et al. | |
| 2007/0006871 A1 | 1/2007 | Strachan | |
| 2007/0006872 A1 | 1/2007 | Strachan | |
| 2007/0125362 A1 | 6/2007 | Ford et al. | |
| 2007/0131219 A1 | 6/2007 | Ford et al. | |
| 2007/0157921 A1 | 7/2007 | Rankin | |
| 2007/0163569 A1 | 7/2007 | Strachan | |
| 2007/0167341 A1 | 7/2007 | Burt | |
| 2009/0078711 A1 | 3/2009 | Farone et al. | |
| 2009/0199843 A1 | 8/2009 | Farone et al. | |
| 2009/0314667 A1 | 12/2009 | Beyers | |
| 2010/0224510 A1 | 9/2010 | Ford et al. | |
| 2010/0227027 A1 | 9/2010 | Ford et al. | |
| 2014/0230378 A1 | 8/2014 | Ford et al. | |

FOREIGN PATENT DOCUMENTS

| | | |
|---|---|---|
| EP | 0 286 382 A2 | 10/1988 |
| EP | 0 297 724 A2 | 1/1989 |
| EP | 0 815 784 A1 | 7/1998 |
| EP | 0 667 829 B1 | 12/1998 |
| EP | 0 935 108 A2 | 8/1999 |
| EP | 1 164 092 A2 | 12/2001 |
| EP | 1 164 341 B1 | 12/2001 |
| EP | 1 381 549 A1 | 10/2002 |
| EP | 1 120 072 B1 | 11/2002 |
| EP | 1 534 607 B1 | 8/2006 |
| EP | 0 873 073 B1 | 12/2006 |

(56) References Cited

FOREIGN PATENT DOCUMENTS

| | | |
|---|---|---|
| EP | 1 749 465 A1 | 2/2007 |
| EP | 1 956 950 B1 | 9/2009 |
| EP | 2 405 791 | 1/2012 |
| GB | 1 455 188 A | 11/1976 |
| GB | 1 455 788 | 11/1976 |
| GB | 1455188 * | 11/1976 |
| GB | 2 183 017 A | 5/1987 |
| GB | 2 225 104 A | 10/1989 |
| GB | 2 329 459 A | 3/1999 |
| GB | 2 329 461 A | 3/1999 |
| GB | 2 363 451 A | 12/2001 |
| GB | 2 365 107 A | 2/2002 |
| GB | 2 422 659 A | 8/2006 |
| GB | 2 429 055 A | 2/2007 |
| JP | 01-196227 | 1/1988 |
| JP | 01-266130 | 4/1988 |
| JP | 01-274002 | 5/1988 |
| JP | 02-217061 | 2/1989 |
| JP | 64037372 | 2/1989 |
| JP | 03-102397 | 9/1989 |
| JP | 03-170259 | 12/1989 |
| JP | 03-004819 | 1/1991 |
| JP | 05-258202 | 2/1992 |
| JP | 04-117921 | 4/1992 |
| JP | 01-240472 A | 9/2001 |
| JP | 01-308778 A | 11/2001 |
| JP | 2009-515785 | 4/2009 |
| NL | 7401810 | 12/1974 |
| WO | WO 93/17928 | 9/1993 |
| WO | WO 97/00637 | 1/1997 |
| WO | WO 97/49319 | 12/1997 |
| WO | WO 01/04548 | 1/2001 |
| WO | WO 01/24672 | 4/2001 |
| WO | WO 01/92128 | 12/2001 |
| WO | WO 02/085748 | 10/2002 |
| WO | WO 02/098761 | 12/2002 |
| WO | WO 2004/022450 | 3/2004 |
| WO | WO 2005/037953 | 4/2005 |
| WO | WO 2005/108878 | 11/2005 |
| WO | WO 2005/115872 | 12/2005 |
| WO | WO 2006/009878 | 1/2006 |
| WO | WO 2006/091182 | 8/2006 |
| WO | WO 2006/093849 | 9/2006 |
| WO | WO 2006/097699 | 9/2006 |
| WO | WO 2006/100412 | 9/2006 |
| WO | WO 2006/101483 | 9/2006 |
| WO | WO 2006/109098 | 10/2006 |
| WO | WO 2006/117543 | 11/2006 |
| WO | WO 2007/016416 | 2/2007 |
| WO | WO 2007/070893 | 6/2007 |
| WO | WO 2007/080359 | 6/2007 |
| WO | WO 2009/145657 | 3/2009 |
| WO | WO 2009/042955 | 4/2009 |
| WO | WO 2010/104889 | 9/2010 |

OTHER PUBLICATIONS

International Search Report, Application No. PCT/US2008/078003, dated Nov. 19, 2009, 12 pages.
Kita Sangyo Co., Ltd., "Self Heating Can! English Edition", May 31, 2002, pp. 1-9.
Mok Zhenyuan et al., "Business Plan Report: HeatUp Food Warming Ware by Exotherm", MGMT 002 Technology & World Change, Singapore Management University, Lee Kong Chian School of Business (http://www.research.smu.edu.sg/faculty/twc/TWC2005/entries.html), Mar. 15, 2005, pp. 1-15.
Preliminary Report on Patentability and Written Opinion, Application No. PCT/US2006/044233, dated May 22, 2008, 9 pages.
Preliminary Report on Patentability with Written Opinion, Application No. PCT/US2006/044174, dated May 22, 2008, 6 pages.
Torrone, "Inside a Wolfgang Puck Self-Heating Can . . .", MakeZine.com (http://www.makezine.com/extras/48.html), Nov. 21, 2005, pp. 1-11.
International Search Report and Written Opinion, Application No. PCT/US2012/026721, dated Jun. 6, 2010, 10 pages.
Preliminary Report on Patentability and Written Opinion, Application No. PCT/US2010/026721, dated Sep. 9, 2011, 4 pages.

* cited by examiner

SELF-HEATING SYSTEMS AND METHODS FOR RAPIDLY HEATING A COMESTIBLE SUBSTANCE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTIONS

1. Field of the Inventions

The present inventions generally relate to self-heating systems and methods, and more particularly to self-heating systems and methods for rapidly heating a comestible substance.

2. Description of the Related Art

In today's on-the-go consumer society, there is increasing demand for a convenient and effective container which may be used by consumers to heat consumable products, such as coffee, tea, milk, soup, and many other types of beverage or food products, at any time and any location, without having access to any conventional heating means, such as a coffee maker, microwave, cook top, etc. Self-heating technology based on an exothermic reaction between different reagents is often used in such containers. Typically, two or more reagents are initially separated by a breakable partition in the container, and when heat needs to be generated, the partition is broken to allow the mixing of the reagents, thereby creating an exothermic reaction for heat generation. Typically, the reagents employed for generating the heat include at least a solid material, such as calcium oxide, and a liquid material, such as water.

The prior art self-heating systems, however, have many shortcomings. For example, the speed for heating larger volumes of beverage or food to temperature is generally slower than desired, especially in today's on-the-go consumer society. Moreover, the temperature of the beverage or food typically cannot be maintained for an extended period of time after the exothermic reaction. Further, the self-heating containers are often not designed for effective separation, deployment, and mixing of the chemical reactants therein. Thus, there is a need for an improved or alternative self-heating system and method for heating beverage and food.

SUMMARY OF THE INVENTIONS

The preferred embodiments of the present invention provide an improved self-heating system that is engineered to control and optimize the performance of the system and ameliorate at least some of the shortcomings of prior art systems. Implementations of the various combinations of pre-selected product and process parameters and features disclosed herein result in certain improved self-heating systems having performance characteristics which the inventors believe have not been achieved by prior art self-heating systems. However, no single one of the disclosed parameters and features is solely responsible for their desirable attributes and not all of the parameters and features are necessary to achieve the advantages of the systems. After considering this discussion, and particularly after reading the section entitled "Detailed Description of the Preferred Embodiments," one will understand how the features of the preferred embodiments provide advantages over prior art.

Certain embodiments of self-heating systems and methods disclosed herein are compact and disposable self-heating containers capable of heating at least 6 fluid ounces of a comestible substance, such as coffee or tea, from room temperature to at least 145° F. in less than one minute. Some such embodiments require agitation of reactants during an exothermic reaction while others require little, if any, agitation of the reactants during the exothermic reaction. Some embodiments also have compact configurations that allow the self-heating containers to be easily carried and used.

Certain embodiments of self-heating containers disclosed herein provide improved apparatuses for maintaining reactants, which are intended for exothermic reaction, separated until initiation of the exothermic reaction is desired. At that time, such embodiments predictably and reliably release at least one reactant from a first compartment into a second compartment to initiate the exothermic reaction. Some embodiments are configured to facilitate rapid mixture of the reactants. Some embodiments additionally or alternatively promote uniform mixing of the reactants. Various embodiments resist environmental effects thereby providing long shelf-lives.

In accordance with at least one of the embodiments disclosed herein, a container adapted to change the temperature of a comestible substance is provided. The container generally comprises an outer body comprising a plurality of sidewalls which together define a recess, and a receptacle disposed in the recess and adapted to store the comestible substance. Preferably, the receptacle is coupled to the outer body to form a chamber between the receptacle and the outer body, wherein at least a portion of the chamber substantially surrounds the receptacle. The container further comprises a barrier positioned within the chamber to divide the chamber into a first and a second compartment, wherein each compartment is adapted to receive at least one chemical reactant. The barrier preferably comprises a stationary member and a movable member, wherein the stationary member is substantially fixed relative to the outer body. Preferably, the stationary member has a fixed sized opening and the movable member is removably attached to the stationary member and adapted to seal the opening. When a predetermined threshold force is applied to a preselected area on the container, the movable barrier member separates from the stationary barrier member in a manner such that the movable barrier member is completely detached from the stationary barrier member, resulting in the entire fixed sized opening being uncovered, thus allowing one or more chemical reactants to flow from one chamber to the other at a predictable rate, wherein the pressure from the out-flowing chemical reactants pushes the movable barrier member away from the opening to substantially inhibit the movable barrier member from blocking portions of the opening, wherein the reaction involving the chemical reactants causes the temperature of the comestible substance to change.

In accordance with at least one of the embodiments disclosed herein, a container for changing the temperature of a comestible substance comprises an outer container body, an inner container body, and a barrier. The outer container body defines a recess and comprises a movable portion. The inner container body defines a recess to accommodate the comestible substance. The inner container body is connected to the outer container body to form a chamber. The barrier is positioned within the chamber to divide the chamber into a first compartment and a second compartment. At least a first reactant is positioned within the first compartment. At least a second reactant is positioned within the second compartment. The barrier comprises a first barrier member and a second barrier member. The first barrier member has an opening and is substantially fixed relative to the outer container body. The second barrier member is removably attached to the first barrier member to seal the opening. Movement of the movable portion of the outer container body separates the second barrier member from the first barrier member to allow contact between the first reactant and the second reactant. A reaction involving at least the first reactant and at least the second reactant causes the temperature of the comestible substance to change.

In accordance with at least one of the embodiments disclosed herein, a container for a comestible substance comprises an inner container body, an outer container body, a barrier, and an actuator. The inner container body forms a receptacle to receive the comestible substance. The outer container body is attached to the inner container body forming a chamber between the outer container body and the inner container body. The barrier is disposed within the chamber and at least partially separates a first compartment of the chamber from a second compartment of the chamber. The barrier comprises a first barrier member and a second barrier member. The first barrier member is removably mechanically coupled to the second barrier member. The actuator is configured to engage the second barrier member to decouple the second barrier member from the first barrier member and permit one of the first reactant and the second reactant to move between the first compartment and the second compartment. Preferably, the second barrier member will not decoupled from the first barrier member unless a predetermined amount of force is applied to the actuator. The predetermined amount of force is preferably selected to inhibit accidental removal of the barrier member.

In accordance with at least one of the embodiments disclosed herein, a method for preparing a self-heating container comprises placing a first reactant in a first compartment of the container and placing a second reactant in a second compartment of the container. The method further comprises positioning at least a first barrier member between the first compartment and the second compartment. The method further comprises mechanically engaging a second barrier member with the first barrier member to separate the first compartment from the second compartment such that contact between the first reactant and the second reactant is inhibited and such that movement of the actuator rapidly disengages the second barrier member from the first barrier member to allow at least one of the first reactant and the second reactant to move between the first compartment and the second compartment to contact the other of the first reactant and the second reactant.

In accordance with at least one of the embodiments disclosed herein, a self heating system for heating a comestible substance comprises a container body defining a volume for holding about 6-12 fluid ounces of a comestible substance and a reaction chamber adjacent the container body adapted to house a plurality of reactants. At least two of the reactants are separated by a rupturable barrier. Rupture of the barrier allows contact between the reactants to form a reaction mixture and initiate a multi-stage exothermic reaction. The exothermic reaction generates sufficient heat during a first stage of the reaction to cause, for an initial duration, at least a portion of the contents of the reaction chamber to have a temperature of at least 212° F. A portion of the heat from the exothermic reaction is rapidly transferred to the comestible substance in the container body. The amount and rate of heat transferred are at least sufficient to heat the comestible substance from a temperature of about 80° F. to a temperature of about 145° F. within one minute of the initiation of the exothermic reaction. In certain embodiments, the heat is sufficient to heat the comestible substance from about 75° F. to about 145° F. within one minute of the initiation of the exothermic reaction. In certain other embodiments, the heat is sufficient to heat the comestible substance from about 70° F. to about 145° F. Preferably, the heat transferred is controlled in a manner such that the comestible substance does not reach a temperature greater than about 212° F. After rapidly raising the initial temperature of the comestible substance, the exothermic reaction is configured to generate a lesser amount of heat during a second stage of the exothermic reaction than during the first stage of the exothermic reaction. A portion of the heat generated during the second stage of the reaction is also transferred to the comestible substance at a rate that is capable of maintaining the temperature of the comestible substance at or above 145° F. for at least 2 minutes. The self-heating system is configured such that about 60%-90% of the heat generated from the exothermic reaction is transferred to the comestible substance when the coefficient of heat transfer from the reaction mixture to the comestible substance is about 0.0167 to about 0.0833 BTU/(ft$^2$·sec·° F.).

In accordance with at least one of the embodiments disclosed herein, a self-heating container for heating a comestible substance of a certain volume, preferably between about 6-12 fluid ounces, comprises a first chamber for accommodating the comestible substance, a second chamber for accommodating chemical reactants, and a rupturable barrier adapted to separate the chemical reactants, preferably separating an aqueous solution from a solid chemical reactant mixture. The second chamber is in thermal communication with the first chamber. The rupturable barrier is disposed within the second chamber in a manner so as to divide the second chamber into a first compartment and a second compartment. The first compartment is adapted to receive the aqueous solution and the second compartment is adapted to receive the solid chemical reactant mixture. Rupture of the barrier allows mixing between the aqueous solution and the solid chemical reactant mixture to form an exothermic reaction mixture. A surface between the first chamber and the second chamber is contacted by the exothermic reaction mixture to facilitate heat transfer from the first chamber to the second chamber. In one embodiment, the surface comprises at least a portion of the exterior wall of the first chamber. In a preferred implementation, the container is configured so that the ratio of the surface area contacted by the exothermic reaction mixture to the volume of the comestible substance to be heated is at least 2.5 square inches per 1 cubic inch. Reaction of the aqueous solution and the solid chemical reactant mixture results in a temperature above 212° F. within the second chamber soon after the reaction begins and maintains a temperature of at least 170° F. within the second chamber for at least one minute. At least 60% of the heat generated by reaction of the aqueous solution and the solid chemical reactant mixture is transferred to the comestible substance. The coefficient of heat transfer from the reaction of the aqueous solution and the solid chemical reactant mixture to the comestible substance is preferably at least 0.0167 BTU/(ft$^2$·sec·° F.).

In accordance with at least one of the embodiments disclosed herein, a container for a comestible substance is provided. The container generally comprises an outer body having a height of between about 5 to 8 inches and an average cross-sectional area of between about 3 to 4 square inches. The container further comprises a heating chamber disposed within the outer body and has a volume adapted to receive between about 10 to 18 fluid ounces of a comestible substance, a reaction chamber disposed within the outer body and adapted to house a predetermined amount of reactants and allow the reactants to undergo an exothermic chemical reaction and generate heat. Preferably, the coefficient of heat transfer from the reaction chamber to the comestible substance is at least between about 0.0167 BTU/(ft$^2$·sec·° F.) to 0.0833 BTU/(ft$^2$·sec·° F.) such that the temperature of the comestible substance can be raised from room temperature to about 145° F. within one minute of the initiation of the exothermic chemical reaction and wherein the temperature of the comestible substance does not exceed about 212° F.

In accordance with at least one of the embodiments disclosed herein, a container for a comestible substance comprises a first chamber, a second chamber, and a breakable barrier. The first chamber receives the comestible substance, which has a volume. The second chamber is in thermal communication with the first chamber. The breakable barrier is disposed within the second chamber between a first compartment and a second compartment. A first reactant is located within the first compartment and a second reactant is located within the second compartment. In some embodiments, a third reactant is also located within the second compartment. When the barrier is broken, a reaction of the first reactant with the second reactant and/or the third reactant generates steam within the second chamber and thereafter maintains an average temperature of about 170° F. for at least one minute, preferably between about 1 to 2 minutes. In a preferred implementation, the configuration of the container in combination with predetermined amounts of each reactant result in the combined volumes of the reactants being sufficient to cover a surface separating the first and second chambers such that the ratio of the surface area covered by the reactants to the volume of the comestible substance to be heated is at least 2.5 square inches per cubic inch. In another preferred implementation, the configuration of the container and heat transfer properties of the material are preferably selected to result in at least 60% of the heat generated by the chemical reaction in the second chamber to be transferred to the comestible substance in the first chamber. The coefficient of heat transfer from the reaction of the aqueous solution and the solid chemical reactant mixture to the comestible substance is at least 0.0167 BTU/(ft$^2$·sec·° F.).

In accordance with at least one of the embodiments disclosed herein, a self-heating container designed to withstand pressure of the steam generated from the exothermic reaction therein is provided. The container generally comprises an outer shell defining a space, an inner container disposed within the space wherein the outer shell and the inner container are coupled together by a double seam. The container further comprises a seal plate disposed inside the shell and extends annularly along the interior wall of the outer shell so as to provide structural reinforcement. The seal plate serves multiple functions by providing a barrier between the reactants and also providing structural reinforcement. In one embodiment, the container incorporating the structural reinforcements is capable of withstanding at least 17 psig of internal pressure without rupturing. In another embodiment, the container incorporating the structural reinforcements is capable of withstanding an internal pressure of between about 40-45 psig without rupturing.

All of these embodiments are intended to be within the scope of the present inventions herein disclosed. These and other embodiments of the present inventions will become readily apparent to those skilled in the art from the following detailed description of the preferred embodiments having reference to the attached figures, the inventions not being limited to any particular preferred embodiment(s) disclosed.

DETAILED DESCRIPTION OF THE PREFERRED EMBODIMENTS

In various embodiments, the self-heating system disclosed herein is preferably a compact self-heating container configured to hold a comestible substance, such as about 6-12 fluid ounces of a beverage, and rapidly heat the substance by reaction of chemicals that are held within the container and separated from the substances to be heated. In preferred implementations, the self-heating system is configured so that the amount and rate of heat transferred to the comestible substance are controlled in accordance with the volume of substance to be heated to ensure rapid heating of the substance without overheating. The preferred embodiments of the self-heating system incorporate engineered improvements in various aspects of the system, including improved container construction and design, optimized heat transfer properties, and controlled heat generation systems. Each of these attributes will now be discussed in turn.

I. Container Construction and Design

Certain embodiments of self-heating containers will now be described more fully hereinafter with reference to the accompanying drawings. The containers may, however, be embodied in many different forms and should not be construed as limited to the embodiments set forth herein.

Figure 1:
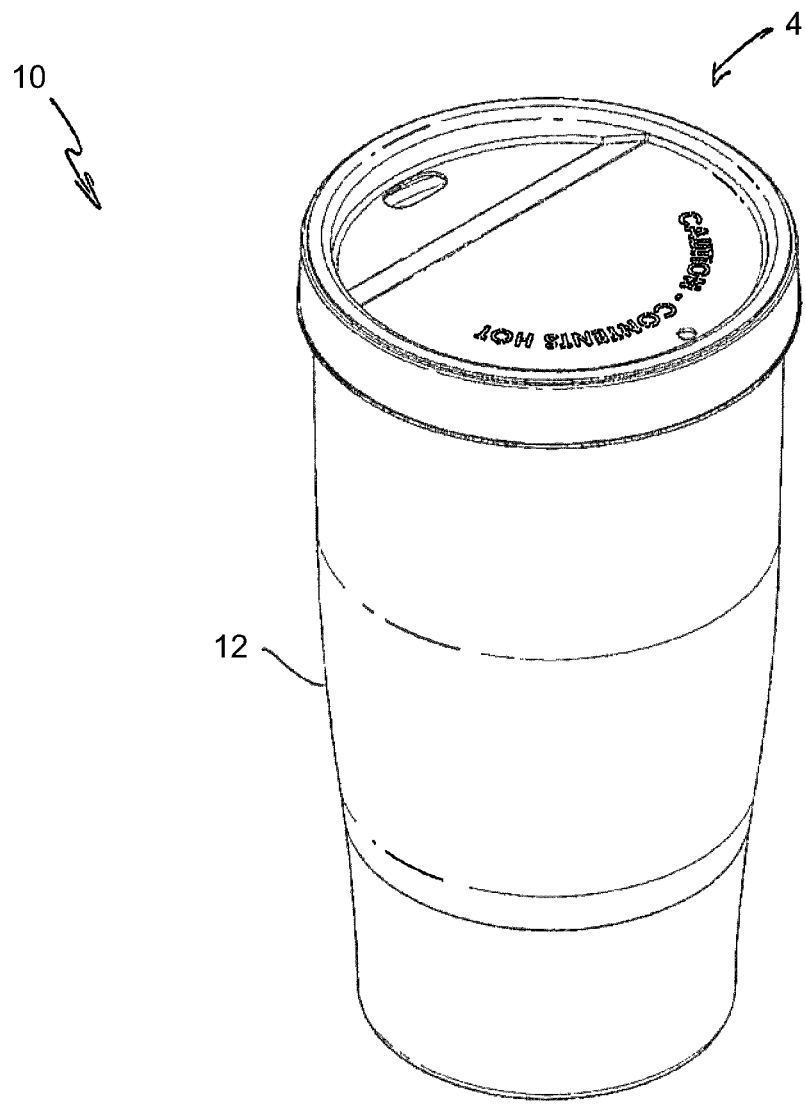
FIG. 1 is a perspective view of a self-heating system according to one embodiment, shown in the form of a container.

FIG. 1 illustrates a perspective view of a container 10, according to one embodiment. As shown in FIG. 1, the container 10 has an elongated, canister-shaped body configured to be held by a person's hand like most individual beverage containers. Referring to the cross-sectional illustration of FIG. 2, the container 10 includes an outer container body 12, an inner container body 14 disposed within the outer container body 12, a reaction chamber 13 for generating heat from exothermic reactions, and a heating chamber 15 for receiving beverage, food item, or any other consumable products or substances to be heated. The reaction chamber 13 is disposed in a space between the outer and inner container bodies 12, 14 and the heating chamber 15 is located inside the inner container body 14. The reaction chamber 13 is preferably arranged to substantially surround the heating chamber 15 to facilitate heat transfer thereto in a manner to be described in greater detail below. In preferred implementations, the container further includes a first compartment 16 and a second compartment 22, which are disposed within the reaction chamber 13 and separated by a breakable partition or barrier 28.

Figure 2:
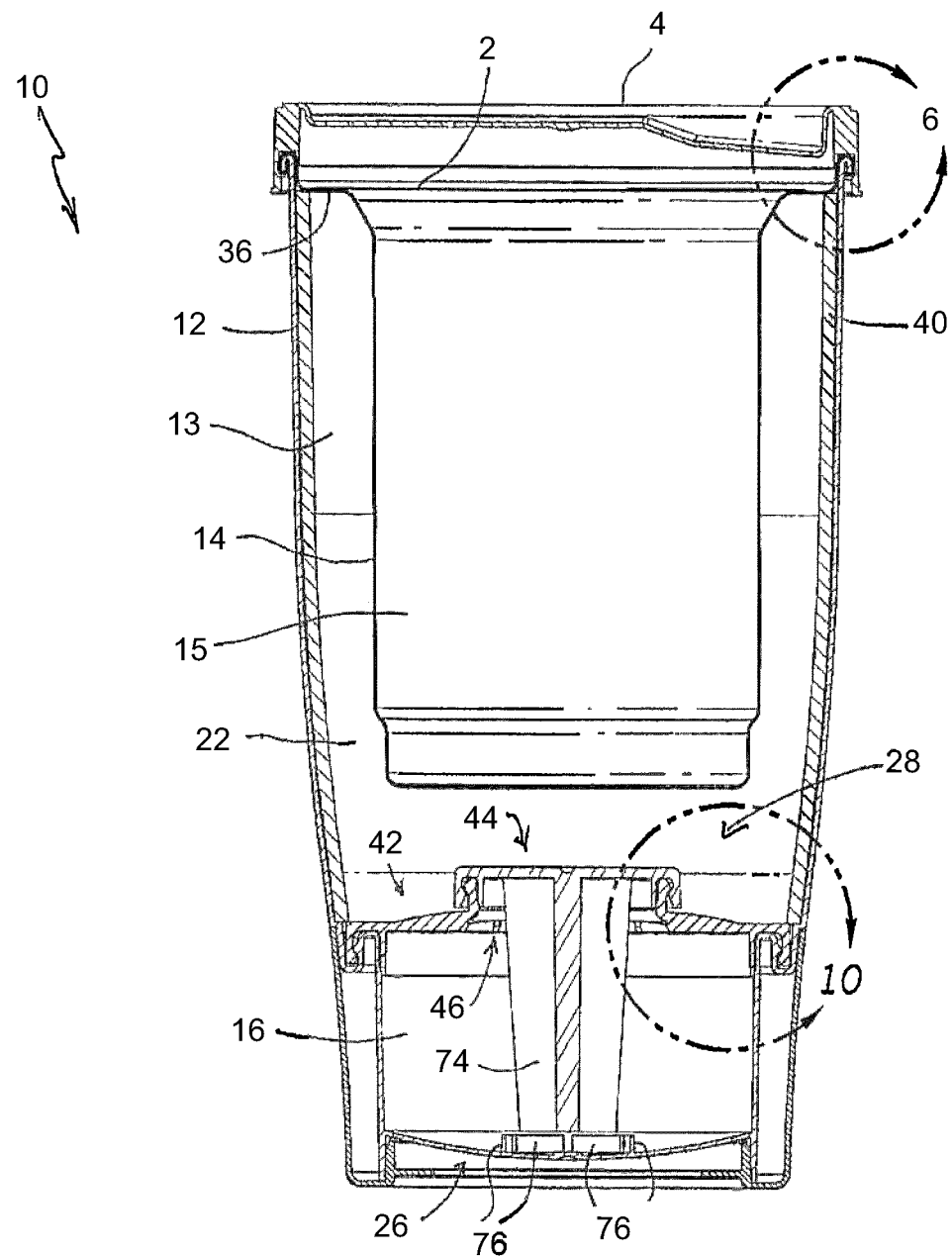
FIG. 2 is a cross-sectional view of the container of FIG. 1.

In the embodiment shown in FIGS. 1 and 2, the heating chamber 15 is located inside the inner container body 14 while the reaction chamber 13 is positioned between the inner and outer container bodies and substantially surrounds the heating chamber 15. However, the configuration and relative positioning of the heating chamber and reaction chamber can vary in other embodiments of the invention. In some embodiments, the reaction chamber 13 is disposed inside the inner container body, preferably as part of an insertable module, while the heating chamber containing the beverage or food items is positioned in the space between the inner and outer container bodies surrounding the reaction chamber. Further details regarding some of the alternative configurations are found in U.S. Patent Application Publication Number 2003/0205224, published Nov. 6, 2003, which is hereby incorporated by reference in its entirety.

As in the embodiment illustrated in FIG. 2, the inner container body 14 can be generally cylindrical. In such embodiments, the inner container body 14 can have a cross-section which is generally circular, square, triangular or other shape. In some embodiments, the inner container body 14 can have other shapes such as generally conical, generally frustoconical, generally hemi-spherical, or other shapes, alone or in combination.

In a preferred embodiment, the inner container body 14 is constructed with a material having high thermal conductivity. For example, the inner container body 14 can be constructed of a metallic material such as aluminum or a polymeric material, such as polyolefin. In some embodiments, the outer container body 12 can be generally cylindrical. In such embodiments, the outer container body 12 can have a cross-section which is generally circular, square, triangular or other shape. In some embodiments, the outer container body 12 can have other shapes such as generally conical, generally frustoconical, generally semi-spherical, or other shapes.

Figure 3:
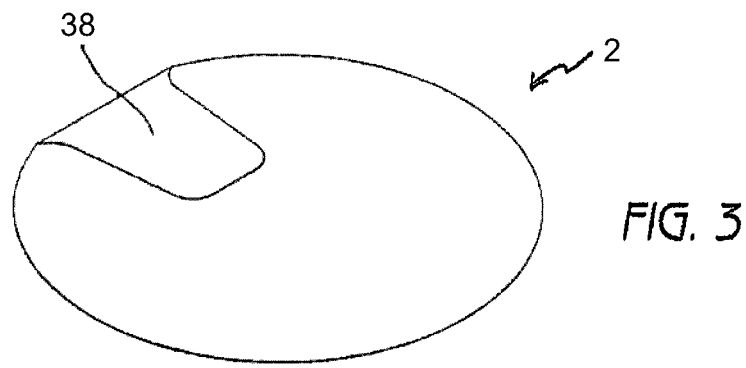
FIG. 3 is a top perspective view of a pull tab lid of the container of FIG. 1 according to one embodiment.

The container 10 can include a lid 2, such as is illustrated in FIGS. 2 and 3, covering the inner container body 14 to enclose the substance inside the heating chamber 15. The inner container body 14 can include a rim 36 to provide a region for attachment with the lid 2. The lid 2 preferably obstructs an opening of the inner container body 14 to keep inside the substance to be heated, as shown in FIG. 2. In some embodiments, the lid 2 is sealed to the rim 36 of the inner container body 14. Referring to FIG. 3, in some embodiments, the container 10 can include a lid 2 with a pull tab 38. The lid 2 can be made of any suitable material such as aluminum, alone or in combination with other materials.

In some embodiments, the heating chamber 15 can be large enough to accommodate about 6 fluid ounces, 8 fluid ounces, 10 fluid ounces, 12 fluid ounces or more of comestible substance. In one embodiment, the heating chamber 15 has a total volume of about 9.8 fluid ounces. The volume of the heating chamber 15 in preferably greater than the volume of the comestible substance to be heated. For example, the enclosed heating chamber volume can be about 10%, 20%, 30% or more than the volume of the comestible substance. In one embodiment, the heating chamber 15 in the inner container body 14 is sufficiently large to hold a liquid capacity of greater than or equal to about 100 mL (3.38 fluid ounces), preferably between about 100 mL to 200 mL (3.38 to 6.76 fluid ounces). In another embodiment, the heating chamber 15 is sufficiently large to hold a liquid capacity of greater than or equal to about 200 mL (6.76 fluid ounces), preferably between about 200 mL to 300 mL (6.76 to 10.14 fluid ounces). In various embodiments, the heating chamber 15 may be sufficiently large to hold a comestible substance with a volume of at least six fluid ounces (177 mL), preferably between about 6 to 12 fluid ounces (177 mL to 355 mL), preferably about 10 fluid ounces (296 mL), preferably about 12 fluid ounces (355 mL), preferably between about 12 to 18 fluid ounces (355 mL to 532 mL), or more. While the heating chamber is adapted to receive a large volume of a comestible substance, the container preferably has a compact configuration that can be easily carried by a person. In one implementation, the container has a height of between about 5 and 8 inches, more preferably about 5.7 inches, or more preferably about 7.2 inches, and an average cross-sectional area of about 7 to 12 square inches, more preferably about 7.25 square inches, or more preferably about 11.5 square inches. In another implementation, the container has an average diameter of between about 7 and 12 inches.

Figure 4:
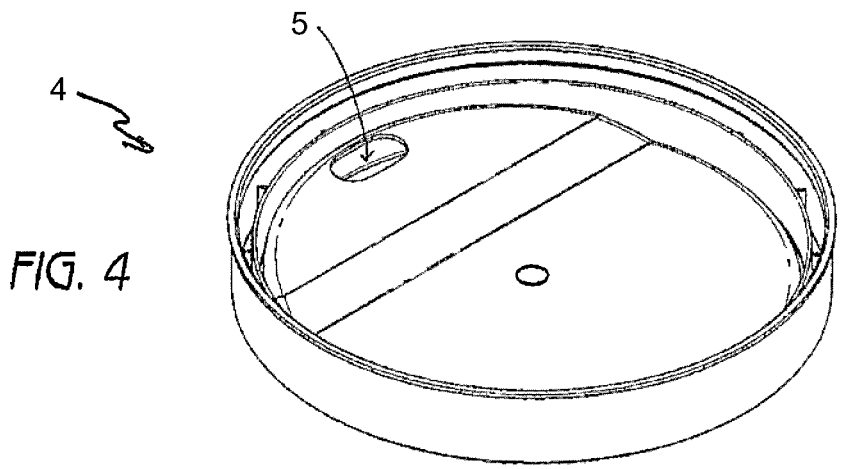
FIG. 4 is a bottom perspective view of a drinking lid of the container of FIG. 1 according to one embodiment.
Figure 5:
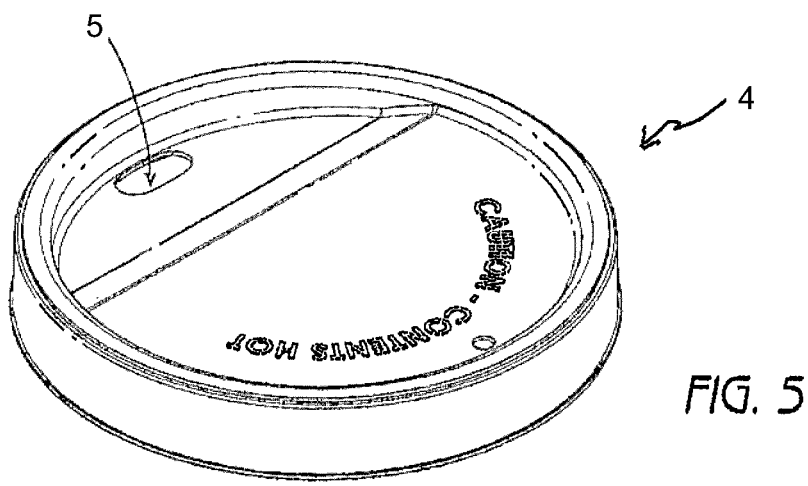
FIG. 5 is a top perspective view of the drinking lid of FIG. 4.

In addition to or in alternative to the lid 2, the container 10 can include a lid 4 to facilitate consumption of the comestible substance. Such lids can have various configurations. For example, the drinking lid 4, illustrated in FIGS. 4 and 5, is configured to snap onto the container 10 and includes an orifice 5 to enable the consumer to consume the substance inside the container 10.

Referring again to FIG. 2, the inner container body 14 can be connected to the outer container body 12. The illustrated outer container body 12 is larger than the inner container body 14 and is shaped to receive the inner container body 14 with the reaction chamber 13 between the outer container by 12 and the inner container body 14. For example, the outer container body 12 can comprise a recess. In some embodiments, the outer container body 12 is sufficiently large to accommodate the inner container body 14 and the reactants.

The reaction chamber 13 is preferably sized to accommodate the reactants. In some embodiments, the volume of the reaction chamber 13 exceeds the volume of the reactants by an amount sufficient to allow unrestrained reaction of the reactants. In some embodiments, the volume of the reaction chamber 13 is larger than the volume of the reactants by a sufficient amount to permit free movement of the reactants during a period of agitation of the reactants, such by shaking, for example, after the barrier 28 has been opened. In one embodiment, the volume of the reaction chamber is approximately 10%-25% greater than the volume of the reactants.

Figure 6:
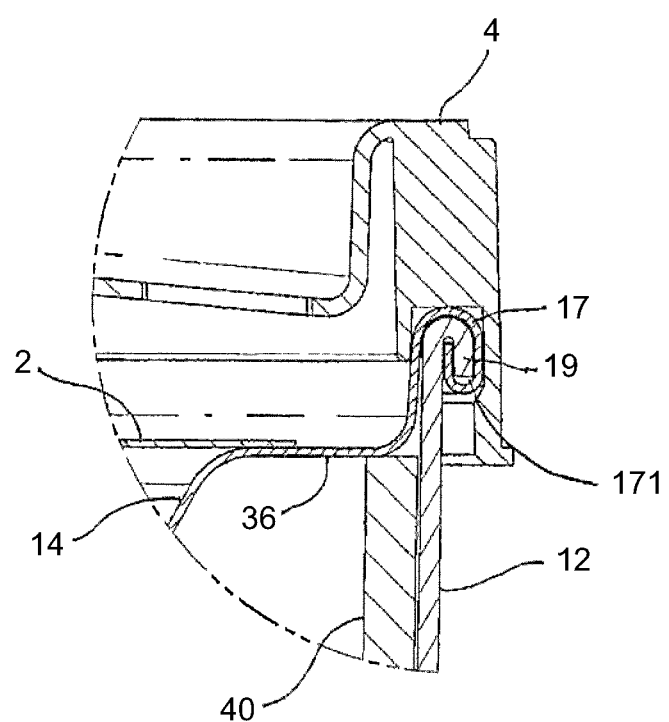
FIG. 6 is an enlarged view of section 6 of the container shown in FIG. 2.

Referring to FIG. 6, in some embodiments, the inner and outer container bodies 14, 16 are secured using a double seam 171 at the lip 17 of the inner container body 14 and the lip 19 of the outer container body 12. The double seam construction provides structural reinforcement to the container so that the container can better withstand pressure from the steam generated from the exothermic reactions. In some embodiments, the inner container body 14 and the outer container body 12 may be formed as a single integrated structure in which the lip 17 of the inner container body 14 and the lip 19 of the outer container body 12 are continuous. Alternatively, the lip 17 of the inner container body 14 may be sealed with the lip 19 of the outer container body 12, using, for example, conventional sealing technologies such as thermal welding, crimping, or seaming.

With continued reference to FIG. 2, in one embodiment, the outer container body 12 is constructed with an insulating material to direct the heat toward the inner container body 14 and to keep the outside surface of the outer container body 12 from getting too hot for the user to hold. For example, the outer container body 12 can be made of an appropriate polyolefin. In some embodiments, the outer container body 12 can be made of polypropylene, polyethylene or other suitable plastic material.

In one embodiment, the outer container body 12 can include a protruding, flexible bottom 26, which, in a relaxed state, protrudes downward. Referring to FIG. 2, when force is exerted on the bottom 26, it can be pushed inward and directed to the inner container body 14. In some embodiments, the bottom 26 can be integrally formed with the outer container body 12, as illustrated in FIG. 2, such as by injection molding or extrusion molding. Alternately, the bottom 26 can be sealed to a surface of the outer container body 12, such as the inside surface, using any welding process.

As shown in FIG. 2, the first compartment 16 is preferably disposed inside the outer container body 12, underneath the inner container body 14 in a spaced relationship. The second compartment 22 is preferably between the inner container body 14 and the first compartment 16. In some embodiments, the second compartment 22 is adjacent to the inner container body 14, as shown in FIG. 2, for example. In some embodiments the first compartment 16 is adjacent to the inner container body 14, while the second compartment 22 is spaced from the inner container body 14. In some embodiments, the first compartment 16 and/or the second compartment 22 is adjacent to the heating chamber 15, such that at least one of the compartments is in thermal communication with the heating chamber 15.

The first compartment 16 is configured to hold at least one reactant, such as a solid chemical reactant mixture or an aqueous solution. The second compartment 22 is configured to hold at least another reactant. Either or both of the compartments 16, 22 can hold 2, 3, 4, or more reactants. In some embodiments, one of the compartments contains an aqueous reactant or solution, while the other compartment contains one or more solid reactants before the barrier 28 is opened.

The first compartment 16 can be made of any suitable material able to withstand heat such as polypropylene, polyethylene, or aluminum. The first compartment 16 can be integrally formed with the outer container body 12, as illustrated in FIG. 2. Alternatively, the first compartment 16 can be formed separately from the outer container body 12. Further details regarding such constructions are provided in U.S. patent application Ser. No. 11/559,873, entitled "SELF-HEATING CONTAINER" and filed on Nov. 14, 2006; U.S. patent application Ser. No. 11/559, 878, entitled "SELF-HEATING CONTAINER" and filed on Nov. 14, 2006; and U.S. patent application Ser. No. 11/862,120, entitled "SELF-HEATING APPARATUSES USING SOLID CHEMICAL REACTANTS" and filed on Sep. 26, 2007; the entireties of all of which are hereby incorporated by reference herein.

In some embodiments, the second compartment 22 contains a sufficient amount of a first reactant that when the container is inverted to be upside down, as compared to the orientation illustrated in FIG. 1, the first reactant covers annularly the outer surface of the inner container body 14. In some embodiments, the reactants together generally or substantially cover the entire exterior surface of the inner container body 14, which contains the reaction chamber, during at least a portion of the duration of the reaction between the reactants. In at least one embodiment, the container is configured so that the reactants together contact about 54 cubic inches of the inner container body 14 which contains a heating chamber that holds about 6 fluid ounces of comestible substance and has a total capacity of about 9.8 fluid ounces. In some embodiments, during at least a portion of the duration of the reaction, the reactants together generally or substantially cover at least about 2.5 square inches of the exterior surface of the inner container body 14 per cubic inch of the comestible substance to be heated, which may be all of or less than the entire surface area of the inner container body 14. In some embodiments, the reactants together generally or substantially cover at least about 3.0 square inches, or at least about 5.2 square inches, or at least about 4.3 square inches of the exterior surface of the inner container body 14 per cubic inch of comestible substance to be heated. Such configurations, which may use the inner container body 14 to hold the substance to be heated, improve the efficiency of heat transfer between the reactants and the substance to be heated. The surface area of the inner container body 14 can be increased, for example, by providing fins that extend from the inner container body 14 into the reaction chamber 13, by corrugating the surface of the inner container body 14, or both.

As shown in FIG. 2, the partition or barrier 28 can be positioned within the reaction chamber 13 between the first compartment 16 and the second compartment 22. The barrier 28 can at least partially separates the first compartment 16 from the second compartment 22. In some embodiments, the barrier 28 divides the reaction chamber 13 into the first compartment 16 and the second compartment 22. The partition or barrier 28 can be ruptured, broken, or otherwise opened to permit contact between the reactants.

In some embodiments, the barrier 28 comprises a first barrier member 42 and a second barrier member 44. The first barrier member 42 has an opening 46 and the second barrier member 44 is removably attach to the first barrier member 42 such that the second barrier member 44 obstructs the opening 46. In some embodiments, the first barrier member 42 and the second barrier member 44 can be made of polyolefin, while in other embodiments one or both of the barrier members 42, 44 can be made of other materials.

In some embodiments, the opening 46 is located in a central region of the first barrier member 42. In some embodiments, the opening 46 is sufficiently large to allow the contents of the first compartment 16 to substantially evacuate into the second compartment 22 in one second or less. In some embodiments the opening 46 can be sufficiently large to allow the contents of the first compartment 16 to substantially evacuate into the second compartment in 0.75 second or less, 0.5 second or less, or 0.25 second or less. Rapid evacuation of the contents of one compartment into the other compartment can expedite reaction of the reactants held in the first compartment 16 and the second compartment 22 prior to opening the barrier 28.

Figure 7:
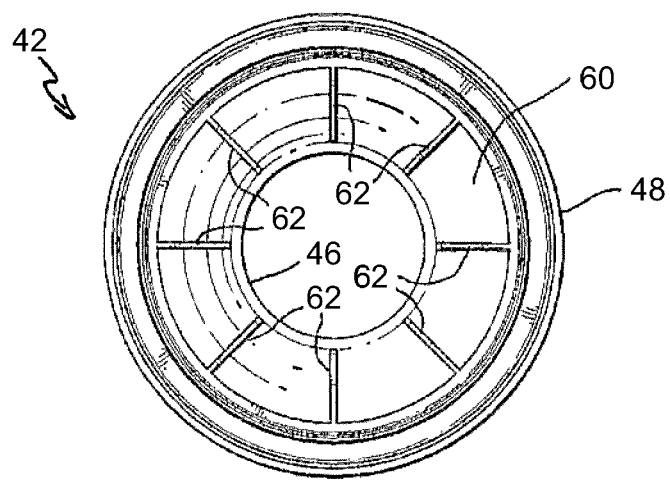
FIG. 7 is a bottom view of a barrier portion of the container of FIG. 1 according to one embodiment.
Figure 8:
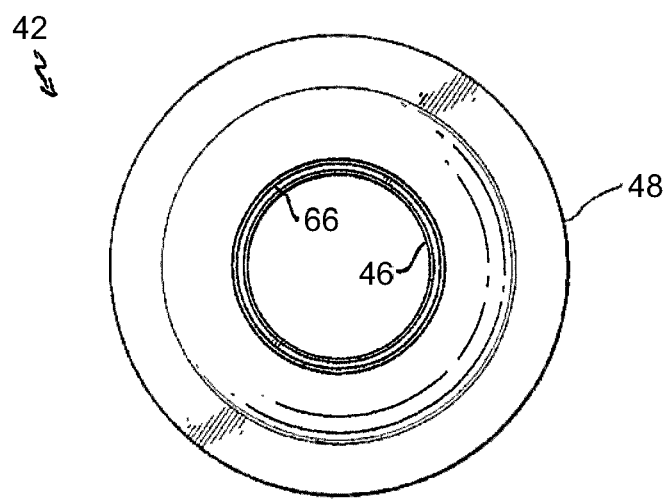
FIG. 8 is a top view of the barrier portion of FIG. 7.

The first barrier member 42 can extend from the opening 46 to an outer periphery 48, as illustrated in FIGS. 7 and 8. The outer periphery 48 of the first barrier member 42 can be shaped to engage another portion of the container 10. For example, the outer periphery 48 of the first barrier member 42 can be shaped to conform to an inner surface of the outer container body 12. Thus, in the embodiment illustrated in FIGS. 2 and 10, the periphery 48 of the first barrier member 42 is generally circular, as illustrated in FIGS. 7 and 8. However, the periphery 48 the first barrier member 42 can have other shapes.

The first barrier member 42 can be fixed to a portion of the container 10 to maintain the position of the first barrier member 42 between first compartment 16 and the second compartment 22. In the embodiment illustrated in FIGS. 2 and 10, the first barrier member 42 is fixed to a portion of the outer container body 12. In some embodiments, the first barrier member 42 can be fixed to a vessel configured to hold one or more of reactants and that is formed separately from the outer container body 12.

The first barrier member 42 can be fixed to the portion of the container 12 by friction, mechanical interference, adhesives, welding, or by other suitable fixation means or a combination thereof. In the embodiment illustrated in FIGS. 2 and 10, the first barrier member 42 comprises a first ring 50 extending downwardly from a lower side of the first barrier member 42 that engages a correspondingly sized and shaped portion 52 of the outer container body 12.

The first ring 50 and the portion 52 of the outer container body 12 can mechanically interfere with each other to inhibit disengagement of the first barrier member 42 from the outer container body 12. For example, in the embodiment illustrated in FIGS. 2 and 10, the first ring 50 can comprise a first bead 54 and the portion 52 of the outer container body 12 can comprise a second bead 56. The first bead 54 and the second bead 56 are sized, shaped, and positioned such that one or both of the first bead 54 and the second bead 56 are deflected from their coupled positions as the second barrier member 44 is detached from the inner container body 12. The first ring 50 can sealingly engage the portion 52 of the outer container body 12 to inhibit, or preferably prevent, fluid communication between the first barrier member 42 and the outer container body 12.

In some embodiments, the first barrier member 42 can further comprise a wall 58 extending downwardly from the lower side of the first barrier member 42. The wall 58 can be sized, shaped, and positioned to engage the portion 52 of the outer container body 12. The wall 58 can inhibit disengagement of the first barrier member 42 from the outer container body 12 by frictional engagement and/or mechanical interference with the outer container body 12, such as, the portion 52 for example. The wall 58 can comprise texturing or other features on a surface that engages the outer container body 12. For example, the wall 58 can comprise one or more protrusions (not shown) that extend from the wall 58 for engagement with the outer container body 12. Such protrusions can comprise rings, bumps, or features having other shapes. In addition to or in alternative to sealing engagement between the first ring 50 and the portion 52 of the outer container body 12, the wall 58 can sealingly engage the outer container body 12 to inhibit, or preferably prevent, fluid communication between the first barrier member 42 and the outer container body 12.

Any or all of the first ring 50 of the first barrier member 42, the first bead 54 of the first barrier member 42, the wall 58 of the first barrier member 42, the portion 52 of the outer container body 12, and the second bead 56 of the outer container body 12 can be formed as a single continuous loop, which can be circular. In some embodiments, one or more of the first ring 50 of the first barrier member 42, the first bead 54 of the first barrier member 42, the wall 58 of the first barrier member 42, the portion 52 of the outer container body 12, and the second bead 56 of the outer container body 12 can be formed as a discontinuous series of constituent members.

Figure 10:
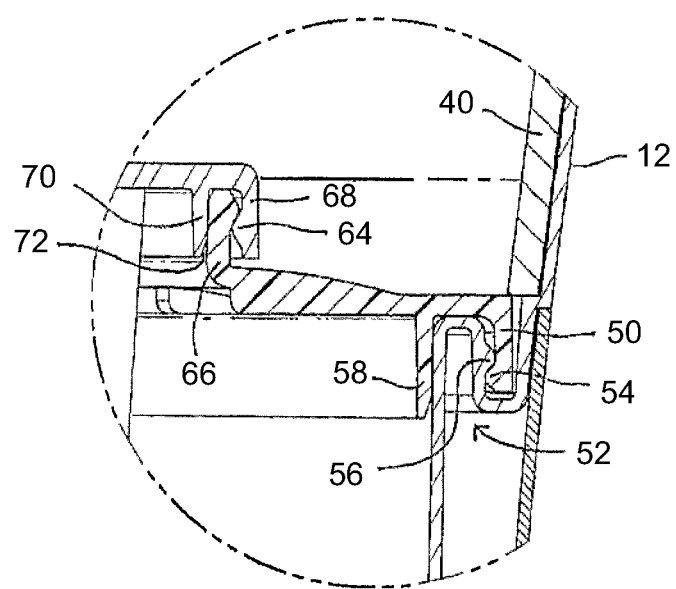
FIG. 10 is an enlarged view of section 10 of the container shown in FIG. 2.

The first barrier member 42 can be generally configured as a plate. In certain embodiments, the first barrier member 42 is configured as a seal plate and coupled to the inner sidewalls of the container in a manner so as to also provide additional structural reinforcement for the container so that the container can withstand higher pressure from steam generated by the exothermic reaction In some embodiments, the first barrier member 42 can be frustoconical, as illustrated in FIGS. 2 and 10. However, the first barrier member 42 can have other configurations such as generally or substantially flat.

The embodiment of the first barrier member 42 that is illustrated in FIG. 2 comprises at least one frustoconical surface 60. The frustoconical surface 60 can direct the contents of the first compartment 16 through the opening 46 into the second compartment 22 to expedite contact between the contents of the first compartment 16 and the contents of the second compartment 22.

Referring to FIG. 7, the first barrier member 42 can comprise a plurality of ribs 62. The ribs 62 can extend between the opening 46 in the periphery 48 of the first barrier member 42. The ribs 62 can increase the rigidity of the first barrier member 42. Additionally or alternatively, the ribs 62 can direct the contents of the first compartment 16 toward the opening 46. While the first barrier member 42 illustrated in FIG. 7 comprises eight ribs 62, the first barrier member 42 can comprise more or less than eight ribs 62 in other embodiments. For example, the first barrier member 42 can comprise 2, 3, 4, 5, 6, 7, 8, 9, 10, 11, or 12 ribs or more.

The second barrier member 44 can be removably attached to the first barrier member 42 to obstruct the opening 46, as illustrated in FIG. 2, for example. The second barrier member 44 can be removably attached to be first barrier member 42 by friction, mechanical interference, adhesives, welding them or by other suitable attachment means or a combination thereof. In some embodiments, the second barrier member 44 can be configured as a cap.

In the embodiment illustrated in FIGS. 2 and 10, the second barrier member 44 is removably mechanically coupled to the first barrier member 42. The second barrier member 44 can be removably mechanically attached to the first barrier member 42 by moving a least portion of one of the first barrier member 42 and the second barrier member 44 over a least a portion of the other of the first barrier member 42 and the second barrier member 44. The first barrier member 42 and the second barrier member 44 can be configured such that movement of the first barrier member 42 away from the second barrier member 44 is inhibited by mechanical interference between at least a portion of the first barrier member 42 and at least a portion of the second barrier member 44.

Figure 9:
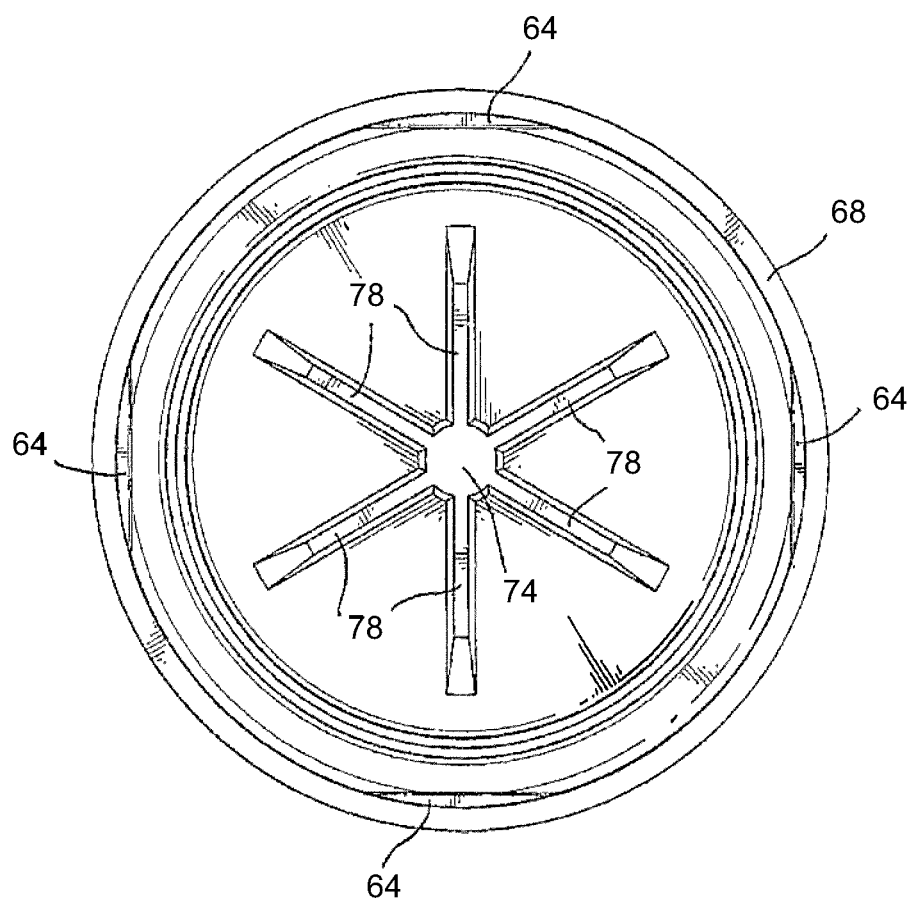
FIG. 9 is a bottom view of a removable barrier portion incorporated as part of a container according to one embodiment.

The second barrier member 44 can comprise one or more engagement members 64, as shown in FIGS. 9 and 10, configured to engage a portion 66 of the first barrier member 42. The second barrier member 44 can comprise four engagement members 64, as illustrated in FIG. 9, or more than or fewer than four engagement members. In some embodiments, the engagement members 64 are evenly spaced, as illustrated in FIG. 9, while in other embodiments the engagement members 64 may not be evenly spaced.

The engagement members 64 of the second barrier member 44 can be connected to a first ring 68 of the second barrier member 44, as shown in FIGS. 9 and 10. The engagement members 64 can form a ring that protrudes radially from the first ring 68 of the second barrier member 44.

The portion 66 of the first barrier member 42 can be formed as a ring that extends upwardly from an upper side of the first barrier member 42, as illustrated in FIGS. 2 and 8. The engagement members 64 and the portion 66 can be configured such that the first barrier member 42 and the second barrier member 44 are removably mechanically coupled by moving the engagement members 64 over the portion 66. The engagement members 64 and the portion 66 are sized, shaped, and positioned such that engagement members 64, the portion 66 or both are deflected from their coupled positions as the second barrier member 44 is detached from the first barrier member 42. In some embodiments, the portion 66 can comprise a ring that radially protrudes from the portion 66.

In some embodiments, the second barrier member 44 can comprise a wall 70. The wall 70 can extend downwardly from the lower side of the second barrier member 44. The wall 70 can be sized shaped and positioned to engage the portion 66 of the first barrier member 42. The wall 70 can inhibit disengagement of the first barrier member 42 from the second barrier member 44 by frictional engagement and/or mechanical interference with the portion 66 of the first barrier member 42. For example, a frictional force between the wall 70 and the portion 66 can inhibit disengagement of the first barrier member 42 from the second barrier member 44. Additionally or alternatively, the wall 70 can inhibit deflection of the portion 66 away from the engagement members 64.

In addition to or in alternative to inhibiting the disengagement of the first barrier member 42 from the second barrier member 44, the wall 70 can facilitate rapid disengagement of the first barrier member 42 from the second barrier member 44. For example, as illustrated in the embodiment of FIG. 10, the wall 70 can comprise an inclined face 72 that faces the portion 66. Once the forces inhibiting disengagement of the first barrier member 42 from the second barrier member 44 are overcome, inclined face 72 tends to push the second barrier member 44 away from the first barrier member 42.

The second barrier member 44 sealingly engages the first barrier member 42. For example, in some embodiments, the wall 70 of the second barrier member 44 sealingly engages the portion 66 of the first barrier member 42. In some embodiments, the first ring 68 of the second barrier member 44 sealingly engages the first barrier member 42.

In some embodiments, the first barrier member 42 and the second barrier member 44 form a snap cap assembly, in which the second barrier member 44 comprises a cap that snaps onto the first barrier member 42.

As discussed above, the size of the opening 46 can be sufficiently large to rapidly evacuate the contents of one compartment into the other. However, as the size of the opening 46 increases, the likelihood of leakage between first barrier member 42 and the second barrier member 44 may also increase. In one embodiment, the cross-sectional area of the opening is preferably about 10% to 35% of the cross-sectional area of the container centered at the centerline of the container. In one implementation, the opening has a diameter of about 1 inch (about 24 mm) and the diameter of the cross-sectional area at the centerline of the container is about 2⅜" (about 62 mm). In another implementation, the area of the opening is about 452.4 mm$^2$ and the total cross-sectional area at the centerline of the container is about 3,019 mm$^2$. In another implementation, the cross-sectional area of the opening 46 is about 20%-80%, more preferably 30%-50%, more preferably about 40% of the cross-sectional area of the seal plate.

The second barrier member 44 can comprise an extension 74, as shown in FIGS. 2 and 9, for example. When the second barrier member 44 is assembled with the first barrier member 42 and the outer container body 12, the extension 74 can extend toward the bottom 26 of the outer container body 12. When the first barrier member 42, the second barrier member 44, and the outer container body 12 are assembled, the lower extent of the extension 74 can be within the range of movement of the flexible bottom 26 of the outer container body 12 such that movement of the bottom 26 toward barrier 28 can separate the second barrier member 44 from the first barrier member 42.

The extension 74 of the second barrier member 44 can comprise a plurality of fins 78, as shown in FIG. 9. Although the extension 74 that is illustrated in FIG. 9 comprises six fins 78, the extension 74 can comprise other numbers of fins in other embodiments. The fins 78 can be interconnected, as illustrated in FIG. 9.

Configurations of the extension 74 that comprise fins 78 can provide one or more advantages. In some embodiments, such configurations can facilitate molding. In some embodiments, the cross-sectional area of such configurations can be significantly smaller than the cross-sectional area of the opening 46 to allow flow of material through the opening 46, while maintaining sufficient rigidity to transmit sufficient force to disengage the second barrier member 44 from the first barrier member 42. In some embodiments, the fins 78 can direct the contents of the first compartment 16 into the second compartment 22.

The bottom 26 can be a movable portion of the outer container body 12 and can protrude away from the barrier 28 in a relaxed state. The bottom 26 can move between a relaxed position and a fully-deflected position. In some embodiments, when the first barrier member 42, the second barrier member 44, and the outer container body 12 are assembled and the bottom 26 is in the relaxed position, the bottom 26 at its nearest point to the second barrier member 44 is spaced from the second barrier member 44 by a distance of approximately 0.1 inch or approximately 0.126 inch in some embodiments. In some embodiments, when the bottom 26 is in the fully-deflected position, the second barrier member 44 must be completely detached from the first barrier member 42. In some embodiments, the bottom 26 causes the second barrier member 44 to separate from the first barrier member 42 when the bottom 26 is in a position between the relaxed position and the fully-deflected position. In some embodiments, displacement of the second barrier member 44 by the bottom 26 over a distance of about 0.1 inch is sufficient to decouple the first barrier member 42 from the second barrier member 44. In some environments, application of a force of at least 2 pounds to the bottom 26 in a direction toward the barrier 28 is sufficient to move the bottom 26 a sufficient distance to separate the first to remember 42 and the second remember 44.

In some embodiments, separation of the second barrier member 44 from the first barrier member 42 such that the second barrier member 44 no longer obstructs the opening 46 allows contact between the contents of the first compartment 16 and the contents of the second compartment 22. For example, in some embodiments, rupture of the barrier 28 allows contact between the aqueous solution and the solid chemical reactant mixture.

In some embodiments, when a user desires to heat the substance in the container 10, the user can invert the container 10 such that the container 10 is upside down, as compared to the orientation of the container 10 that is shown in FIG. 1, and then exert pressure on the bottom 26 to push the bottom towards the inner container body 14. The exerted pressure will push the bottom 26 towards the barrier 28 to engage and move the second barrier member 44 sufficiently to dislodge the secondary member 44 from the first barrier member 42, thereby opening the barrier 28. Upon opening of the barrier 28, at least a first reactant will be released into the second compartment 22 to mix with at least a second reactant. The user may shake the container 10 to facilitate mixture of the reactants, which creates an exothermic reaction to generate heat. Heat from the exothermic reaction is transferred to the beverage or food substance provided inside the heating chamber 15. After the substance is heated, the user may remove the pull tab lid 2, and as an option, attach the drinking lid 4 to the container 10, for consuming the heated substance.

In some embodiments, the flexible bottom 26 can comprise an extension in addition to or in alternative to the extension 74 of the second barrier member 44. In such embodiments, the extension that extends from the flexible bottom 26 and the second barrier member 44 can be in a spaced relationship when a container 10 is assembled such that movement of the bottom 26 can disengage the second barrier member 44 from the first barrier member 42.

Figure 11:
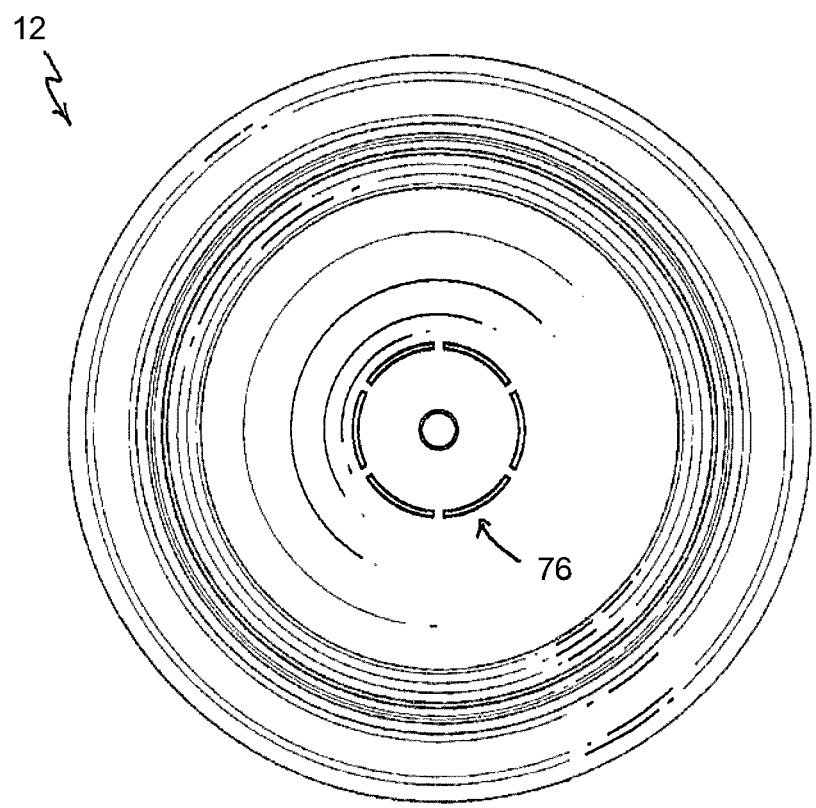
FIG. 11 is a top view of an outer container body of the container of FIG. 1 according to one embodiment.

In some embodiments, the flexible bottom 26 can comprise a wall 76 (FIGS. 2 and 11) extending into the first compartment 16 toward the second barrier member 44, as shown in FIG. 2. The wall 76 is positioned in proximity to the extension 74 of the second barrier member 44 and extends sufficiently far into the first compartment 16 to at least partially surround the extension 74 at some point in the range of movement of the bottom 26. As the flexible bottom 26 is moved toward the second barrier member 44 to disengage the second barrier member 44 from the first barrier member 42, the wall 76 inhibits tilting of the secondary member 44 relative to the first barrier member 42 to facilitate complete disengagement of the second barrier member 44 from the first barrier member 42. The wall 76 can comprise a single member, or a plurality of members as shown in FIG. 11. Segmented configurations of the wall 76, such as the illustrated in FIG. 11, can advantageously improve the flexibility of the bottom 26 as compared to a single continuous wall 76.

Figure 12:
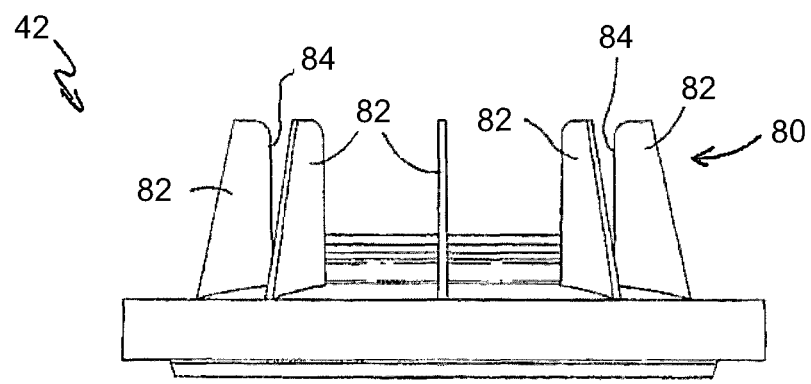
FIG. 12 is a side view of a barrier portion according to one embodiment.
Figure 13:
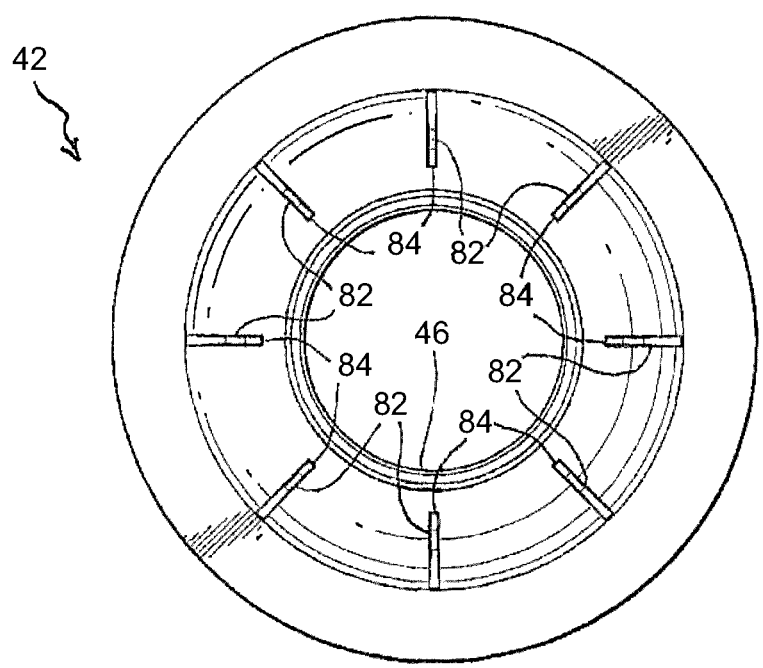
FIG. 13 is a top view of the barrier portion of FIG. 12.
Figure 14:
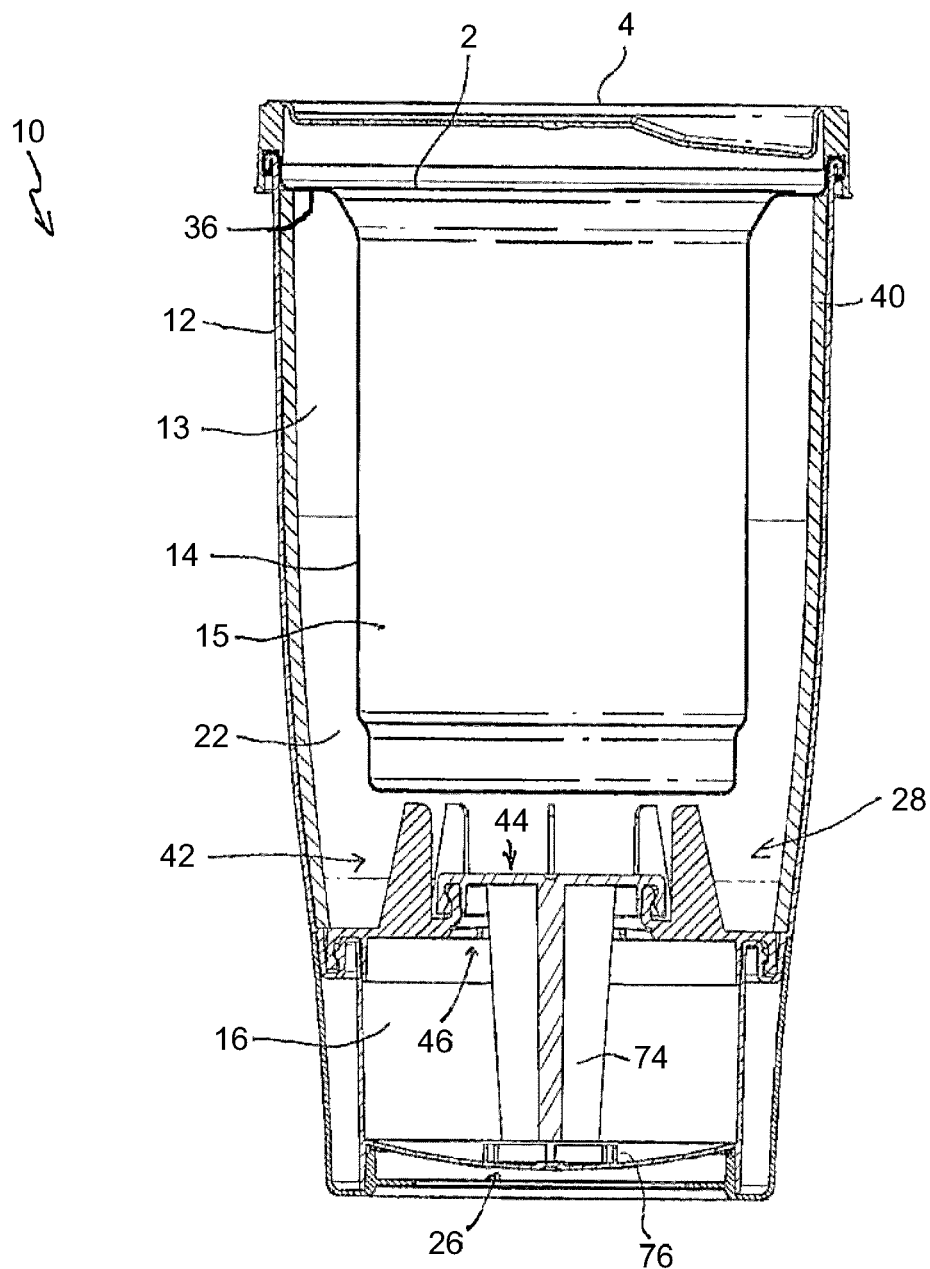
FIG. 14 is a cross-sectional view of a container comprising the barrier portion of FIGS. 12 and 13 according to one embodiment.

In some embodiments, the first barrier member 42 can comprise a centering feature 80 to generally maintain alignment between the first barrier member 42 and the second barrier member 44. For example, the centering feature 80 that is illustrated in FIGS. 12-14 comprises a plurality of members 82 extending upwardly from an upper side of the first barrier member 42. In the illustrated embodiment, the centering feature 80 comprises eight upstanding members 80. In some embodiments, the centering feature 80 can comprise more or fewer than eight upstanding members 80. For example, in some embodiments, the centering feature 80 can comprise 2, 3, 4, 5, 6, 7, 8, 9, 10, 11, 12, or more upstanding members 80. The upstanding members 80 can be positioned generally in proximity to the opening 46 such that surfaces 84 of the upstanding members 80 that face the opening 46 facilitate alignment of the second barrier member 44 with the first remember 42. In some embodiments, the surfaces 84 of the upstanding members 80 can direct the second barrier member 44 toward engagement with the first barrier member 42 during assembly to obstruct the opening 46. Additionally or alternatively, in some embodiments, the surfaces 84 of the upstanding members 80 can facilitate alignment of the secondary barrier member 44 and the first barrier member 42 after the second barrier member 44 has been disengaged from the first barrier member 42. Such alignment after disengagement can advantageously inhibit the second barrier member 44 from obstructing movement of the contents of the first compartment 16 into the second compartment 22. The upstanding members 80 can be spaced from one another, as illustrated in FIGS. 12-14, or may be interconnected to form, for example, a single structure extending from the first barrier member 42. The upstanding members 80 can be evenly spaced around the opening 46, as shown in FIG. 13, or maybe irregularly spaced.

In some embodiments, an open, upper end of the first compartment 16 can be covered with a breakable material which acts as a barrier to keep the reactants in the first compartment 16 and the second compartment 22 from mixing until the partition is broken. For example, the breakable partition can be made of a foil, such as an aluminum foil, that can be pierced and/or cut by a breaking device. Further details regarding breakable partitions and breaking devices are provided in U.S. patent application Ser. No. 11/862,120, filed Sep. 26, 2007, which is hereby incorporated by reference herein in its entirety.

In some embodiments, the parts of the above-described container 10 are made of materials that can withstand at least the maximum temperature that would be reached from the exothermic reaction, which can be at least two hundred and fifty degrees Fahrenheit (250° F.) in some embodiments. In some embodiments, parts of the container 10 are made of materials having a high-class transition temperature, a low heat capacity, or both. Parts of the above-described container 10 that form portions of the reaction chamber 13 are made of materials that seal well. Parts of the container 10 that conduct heat between the reaction chamber 13 and the heating chamber 15 are made of materials that conduct heat well. Other parts of the container 10 are preferably made of materials that insulate well.

In some embodiments, the container 10 includes an insulating layer 40 disposed within the chamber 13 between the outer container body 12 and the inner container body 14. The insulating layer 40 can be positioned along the inner surface of the outer container body within the reaction chamber to inhibit heat loss from the container. Positioning the insulating layer 40 within the reaction chamber 13 between the outer container body 12 and the reactants inhibits absorption by the outer container body 12 of heat created within the reaction chamber 13, thereby directing a greater proportion of the heat generated to the substance to be heated and reducing heating times as compared to configurations that omit the insulating layer 40.

The insulating layer 40 can be made of any suitable insulating material such as Styrofoam, expandable polystyrene, urethane, fiberglass, sprayable foam. In some embodiments, in which the insulating layer 40 is made of expandable polystyrene, the insulating layer 40 can have a thickness of a least 0.070 inch or greater, 0.085 inch or greater, 0.100 inch or greater. The density of such expandable polystyrene can be at least 1.75 pounds per cubic foot, 2.85 pounds per cubic foot or 3.5 pounds per cubic foot.

The insulating layer 40 can be in the form of a sleeve. The insulating layer 40 can form one or more walls of the second enclosed chamber, which can form at least a part of the reaction chamber, to inhibit loss of the heat generated from an exothermic reaction and direct such heat to the inner container body. The insulating layer 40 can reduce the likelihood that the outer surface of the container will become too hot for a consumer to hold. The insulating layer 40 can be used with any of the containers described in this application.

In one embodiment, the insulating layer is structurally molded resulting in a rigid foam, such as an expanded polystyrene foam, which is contoured to the inner shape of the outer container body. The insulating sleeve may be designed to drop into place within the outer container body and be secured by friction. In one embodiment, the insulating sleeve insulates the entire inner surface of the outer container body. In one embodiment, the inner surface of the insulating sleeve maybe textured to assist agitation and reaction of the first and second reactants. For example, the insulating sleeve may have a surface roughness of no less than 0.001 inches. In one embodiment, the insulating sleeve is resistant to high heat and compatible with the heating slurry formed by the mixture of the first and second reactants. In one embodiment, the insulating sleeve density can be adjusted to result in the highest insulating values required by the design and specification of the container.

The following table provides measured values for insulating polystyrene foam used for certain preferred embodiment of the present invention. As shown below, the insulating foam preferably has a thermal conductivity value of between 0.012 to 0.086 BTU/(ft$^2$·sec·° F.), which in turn causes a temperature differential of between 36° F. to about 45.4° F.

|  | A | B | C | D | E | F | G |
|---|---|---|---|---|---|---|---|
| Thickness as measured (in.) | 0.133 | 0.102 | 0.125 | 0.143 | 0.122 | 0.155 | 0.097 |
| Density (g/cc) | 0.049 | 0.043 | 0.041 | 0.045 | 0.056 | 0.037 | 0.012 |
| Surface Temperature (F.) | 170.3 | 168.6 | 168 | 170.7 | 167.8 | 168.2 | 163.7 |
| Temperature Drop (F.) | 36.5 | 36 | 42.1 | 45.4 | 41.4 | 43.5 | 36.5 |
| Thermal conductivity BTU/(ft$^2$·sec·° F.) | 0.0245 | 0.072 | 0.071 | 0.075 | 0.073 | 0.086 | 0.012 |
| R factor (ft$^2$·hr·° F./BTU) | 0.452 | 0.118 | 0.146 | 0.158 | 0.140 | 0.150 | 0.667 |

In one embodiment, the insulating sleeve can be manufactured using a process called "Dry Heat Expansion". In this process, multiple spherical beads, each of which is of an approximate size of granular salt, are positioned in a mold to form the insulating sleeve. After heat is introduced into the mold, the granular beads expand to fill the mold cavity, with their density decreasing from 39 lb/cubic ft. to 3 lbs/cubic ft. or below, depending on the specific thickness limits set for the insulating sleeve. The expanded beads may form a smooth insulating surface, or be further adjusted using any one of the conventional processes to generate certain roughness in the surface, such as an "orange peel" condition.

In one embodiment, the reaction chamber has a plurality of walls made of a material with a thermal conductivity selected to substantially inhibit heat generated from the exothermic reaction from transferring from the reaction chamber through the walls to the exterior of the chamber. Preferably, the material comprising the reaction chamber wall is in direct contact with the exothermic reaction product, and may have a non-smooth surface texture adapted to assist the release of molecules or bubbles when water vapor or steam is generated due to the exothermic reaction in the reaction chamber. In one embodiment, the material has a surface roughness of at least 0.001 inch.

In some embodiments, the container 10 has a thermal efficiency of at least 60% during the period between initiation of the reaction and the time when the comestible substance has reached the desired temperature, thermal efficiency being the amount of heat transferred to the comestible substance within the heating chamber 15 divided by the total amount of heat produced by the exothermic reaction. In some such embodiments, the container 10 has a thermal efficiency of at least 70%, at least 80%, or at least 90%.

In some embodiments, that portion of the heat generated by the exothermic reaction which is not transferred to the comestible substance is not more than 40% of the total heat generated by the exothermic reaction. In some such embodiments, that portion of the heat generated by the exothermic reaction which is not transferred to the comestible substance is not more than 30%, 20%, or 10% of the total heat generated by the exothermic reaction. Such heat that is generated by the exothermic reaction and not transferred to the comestible substance may be retained in the reactants, retained in the container 10, transferred to the environment surrounding the container 10, or some combination thereof.

In some embodiments, the container 10 can have a coefficient of heat transfer between the exothermic reaction and the comestible substance of at least 0.0167 BTU/(ft$^2$·sec·° F.) during the reaction. In some such embodiments, the container 10 can have a coefficient of heat transfer between the exothermic reaction comestibles substance of at least 0.0278 BTU/(ft$^2$·sec·° F.), at least 0.0556 BTU/(ft$^2$·sec·° F.), or at least 0.0833 BTU/(ft$^2$·sec·° F.) during the reaction.

In one embodiment, containers 10 described above with reference to FIG. 2 can be manufactured and assembled in the following process. The outer container body 12 and the inner container body 14 can be separately manufactured using conventional manufacturing methods such as injection molding. If the inside of the inner container body 14 is made of aluminum, it can be coated with any FDA approved coating to protect the beverage or food products from contacting raw aluminum. The first and second barrier members 42 and 44 can be separately made using injection molding or other methods. After each individual piece is manufactured, they can be assembled following the steps below. First, the outer container body is placed into a holder in a filling line. The first barrier member 42 can be sealing secured to the outer container body 12. At least one reactant is then placed in the first compartment 16 through the opening 46 in the first barrier member 42. Thereafter, the second barrier member 42 is sealing engaged with the first barrier member 42 to enclose the first compartment 16. At least one additional reactant is placed in the outer container body 12 in the second compartment 22. The inner container body 14 is placed into the outer container body 12. The reactant in the second compartment 22 may surround the inner container body 14, and the bottom of the inner container body 14 can be proximate to but spaced from the first enclosed compartment 16. The outer container body 12 and the inner container body 14 can be sealed together, such as, for example, by forming a double seam at adjoining lips 17 and 19. Beverage, food or other consumable products can be placed inside the inner container body 14. The consumable product can be sealed in the inner container body 14 using a pull tab lid 2 placed on the inner container body 14. The inner container body 14 and the pull tab lid 2 sealed using a conventional method. The underside of the pull tab lid 2 can be coated with any FDA approved coating to protect the beverage or food products from contacting raw aluminum. A snap-on drinking lid is attached to the top of the container. Other appropriate manufacturing and assembling methods well known to those skilled in the art may also be employed to manufacture and assemble the containers.

In operation, a user may press the bottom 26 of the outer container body 12 toward the inner container body 14, and as a result of the force exerted upon the bottom 26, the second barrier member 44 will be pushed toward the inner container body 14 so that the second barrier member 44 at least partially disengages from the first barrier member 42 to open the barrier 28. Subsequently, the reactant within the first enclosed compartment 16 will be released and mix with the other second reactant provided within the second compartment 22. The heat generated from the exothermic reaction between the two reactants will be transferred and exchanged to heat the substance in the heating chamber 15. When the substance is heated and ready to be consumed, the user can remove the pull tab lid 2 and put the snap-on drinking lid 4 on the container 10. To maximize and facilitate the mixture of two reactants, the user can invert the container 10 such that the container 10 is upside down, compared to the orientation illustrated in FIG. 1, before pressing the bottom 26 of the outer container body 12, and optionally, shake the container after the barrier is opened to cause the mixture.

II. Heat Generation

Heat generation for the self-heating container disclosed herein can be achieved by one or more exothermic reactions involving two or more reactants. For example, the self-heating container can comprise an aqueous solution and a solid chemical reactant mixture. In some embodiments, the solid chemical reactant mixture can include magnesium chloride, calcium chloride, and/or calcium oxide. In such embodiments, the proportions of magnesium chloride, calcium chloride, and/or calcium oxide may be from 10 to 55 parts, from 10 to 35 parts, and from 10 to 20 parts, respectively.

In some embodiments, the total combined mass of magnesium chloride, calcium chloride, and calcium oxide is less than about 100 g. In some embodiments, the solid chemical reactant mixture consists essentially of magnesium chloride, calcium chloride, calcium oxide, and an organic acid. In other embodiments, the solid chemical reactant mixture consists essentially of magnesium chloride, calcium chloride, and calcium oxide such as anhydrous calcium oxide. The magnesium chloride may be selected from the group consisting of anhydrous magnesium chloride, dihydrate magnesium chloride, or a mixture thereof. The calcium chloride may be selected from the group consisting of anhydrous calcium chloride, monohydrate calcium chloride, dihydrate calcium chloride, or a mixture thereof. In some embodiments, the calcium chloride is dihydrate calcium chloride and the magnesium chloride is anhydrous magnesium chloride. Where the calcium oxide, magnesium chloride or calcium chloride is specified as a particular hydration state (e.g. anhydrous, monohydrate, or dihydrate), one of skill will understand that trace amounts of other hydration states may be present as impurities. Similarly, the calcium oxide may contain trace amounts of calcium hydroxide as an impurity.

Upon contacting the aqueous solution with the solid chemical reactant mixture, the aqueous solution reacts with, for example dissolves, the solid chemical reactant mixture thereby producing heat. Where the aqueous solution dissolves the solid chemical reactant mixture, the heat produced is derived at least in part from the heat of solution of the solid chemical reactant mixture. The heat of solution occurs when an amount of chemical is dissolved in an aqueous solution, such as water or a solution containing water as the solvent and diluted. The heat of solution is specific to the exact form of the chemical species.

In certain embodiments, upon contacting the aqueous solution with the solid chemical reactant mixture, the aqueous solution reacts with the solid chemical reactant mixture thereby producing, within five minutes, a heating mixture, having a temperature of at least 200° F. More preferably, a heating mixture having a temperature of at least 200° F. is produced within four minutes, three minutes, two minutes, or one minute. In some embodiments, the heating mixture can have a temperature of at least 200° F. within less than one minute, for example, between 15-30 seconds, between 10-30 seconds, between 10-40 seconds, or between 30-50 seconds. In other embodiments, the heating mixture can have a temperature of at least 200° F. in 30 seconds or less, 15 seconds or less, 10 seconds or less, five seconds or less, two seconds or less, or one second or less. The temperature may be at least 225° F. or approximately 250° F. The temperature may also be from 200° F. to 250° F. In some embodiments, a heating mixture having a temperature of at least 212° F., preferably between 212° F. to 220° F., is produced in two minutes or less, one minute more or less, thirty seconds or less, 15 seconds or less, 5 seconds or less, two seconds or less, or one second or less. In some embodiments, sufficient heat is generated by reaction of the aqueous solution and the solid chemical reactant mixture to produce steam from the aqueous solution.

The temperature of the heating mixture described in the preceding paragraph can be maintained for at least one minute such as between one to two minutes, or more preferably at least two minutes, such as between two to three minutes, three minutes such as between three to four minutes, four minutes such as between four to five minutes, five minutes such as between five to six minutes, or ten minutes. In some embodiments, the heating solution can have an average temperature of at least 170° F. over at least one minute, preferably between one to two minutes. The heating mixture is preferably the mixture formed from the reaction of the solid chemical reactant mixture (or portions thereof) with the aqueous solution.

In some embodiments, the self-heating container comprises a heating chamber for containing a substance to be heated. The container includes a reaction chamber adjacent to the heating chamber. The reaction chamber comprises a first compartment and a second compartment. The first compartment comprises at least a first reactant and the second compartment includes at least a second reactant. The first reactant and the second reactant can be solid chemical reactant mixtures or aqueous solutions. In certain implementations, where the first reactant is the solid chemical reactant mixture, the second reactant is the aqueous solution. And where the first reactant is the aqueous solution, the second reactant is the solid chemical reactant mixture. In certain other implementations, both the first and second reactants are aqueous solutions. The container further comprises a breakable partition or barrier between the first compartment and the second compartment. Upon breaking the barrier, the first and second reactants contact each other and form an exothermic reaction. The barrier or partition can be broken by rupturing or otherwise opening the barrier or partition to allow at least one reactant to pass there through.

The substance to be heated may be any appropriate substance, but are typically liquids, solids, or mixtures thereof. In a preferred embodiment, the substance is a comestible substance (e.g., liquid and/or solid), such as a beverage (e.g., coffee, tea, water, or hot chocolate), a soup, or a solid food within a fluid to be cooked (e.g., noodles within water), etc.

The self-heating container may include an insulating layer on the inner surface of the reaction chamber. In some embodiments, the insulating layer includes a textured surface.

In some embodiments, the self-heating container is used for heating a liquid. The container includes an aqueous solution and a solid chemical reactant mixture having a mass of less than 100 g. Upon contacting the aqueous solution with the solid chemical reactant mixture, the aqueous solution dissolves the solid chemical reactant mixture thereby producing a heating solution capable of heating at least six ounces of the liquid to at least 120° F. More preferably, the liquid is heated to at least 130° F., 140° F., or 150° F. In some embodiments, the liquid is heated to at least 120° F. within two minutes, preferably within one minute, of contacting the aqueous solution with the solid chemical reactant mixture. In some embodiments, upon breaking the breakable partition, the aqueous solution reacts with the solid chemical reactant mixture thereby producing a heating mixture capable of heating at least six ounces of the liquid to a temperature from 130° F. to 150° F.

In some embodiments, the solid chemical reactant mixture can have a mass of less than 75 g. In other embodiments, the solid chemical reactant mixture can have a mass of 75 g or more. The aqueous solution can have a volume of less than 100 mL. The aqueous solution can have a volume of 100 mL or more.

In certain embodiments, the solid chemical reactant mixture used can comprise an anhydrous magnesium chloride and/or dihydrate magnesium chloride, a calcium chloride, and a calcium oxide (e.g., anhydrous calcium chloride such as quicklime). The calcium chloride may be anhydrous calcium chloride, monohydrate calcium chloride, dihydrate calcium chloride, or a mixture thereof. In some embodiments, the calcium chloride is monohydrate calcium chloride, dihydrate calcium chloride, or a mixture thereof. In other embodiments, the calcium chloride is dihydrate calcium chloride.

As the term suggests, solid chemical reactant mixtures are in solid form, meaning that the chemical reactants within the mixture do not include liquid reactants. In some embodiments, the anhydrous magnesium chloride and/or dihydrate magnesium chloride, calcium chloride, and calcium oxide are thoroughly mixed together when added to the self-heating container. In other embodiments, the anhydrous magnesium chloride and/or dihydrate magnesium chloride, calcium chloride, and calcium oxide are present as layers in the self-heating apparatus. Thus, in some embodiments, the anhydrous magnesium chloride and/or dihydrate magnesium chloride, calcium chloride, and calcium oxide are not actually mixed together when forming the solid chemical reactant mixture. The term "mixture," when used in the context of a solid chemical reactant mixture herein, means a substance composed of two or more components, each of which retains its own properties.

The solid chemical reactant mixtures described herein provides surprising and advantageous properties for use within the self-heating containers, such as those described herein. It is typically desirable to achieve a high instantaneous temperature in the heating apparatus and a high heat transfer rate through the container into the substance to be heated. Thus, upon introducing such mixtures in an aqueous solution, significant heat is produced quickly and is maintained effectively over the desired period. For example, where the heating apparatus is a self heating container comprising a heating chamber for containing a substance to be heated, the mixture produces, upon reaction with an aqueous solution, sufficient heat energy to heat a desired amount of the substance and maintain the heat for a desired amount of time.

In some embodiments, the solid chemical reactant mixture consists essentially of an anhydrous magnesium chloride and/or dihydrate magnesium chloride, a calcium chloride, and a calcium oxide. In other embodiments, the solid chemical reactant mixture consists essentially of an anhydrous magnesium chloride and/or dihydrate magnesium chloride, a calcium chloride, a calcium oxide, and an organic acid. In some embodiments, the solid chemical reactant mixture consists of an anhydrous magnesium chloride and/or dihydrate magnesium chloride, a calcium chloride, and a calcium oxide. In other embodiments, the solid chemical reactant mixture consists of an anhydrous magnesium chloride and/or dihydrate magnesium chloride, a calcium chloride, a calcium oxide, and an organic acid. In other embodiments, the solid chemical reactant mixture consists of an anhydrous magnesium chloride, a calcium chloride, a calcium oxide, and an organic acid.

In some embodiments, the mixture employs anhydrous magnesium chloride and not dihydrate magnesium chloride. As described above, the calcium chloride may be anhydrous calcium chloride, monohydrate calcium chloride, dihydrate calcium chloride, or a mixture thereof. In some embodiments, the calcium chloride is a mixture of monohydrate calcium chloride, and dihydrate calcium chloride. The calcium oxide (also known as quicklime) may be present in the mixture in any appropriate solid form.

The organic acid is an acid containing carbon atoms. The organic acid is typically a weak acid containing a carboxyl (—COOH) group, such as citric acid, acetic acid, or lactic acid.

The proportions of anhydrous magnesium chloride and/or dihydrate magnesium chloride, calcium chloride, and/or calcium oxide are from 10 to 55 parts, from 10 to 35 parts, and from 10 to 20 parts, respectively. In some embodiments, the total combined mass of magnesium chloride and/or dihydrate magnesium chloride, calcium chloride, and calcium oxide is less than 100 g. In some embodiments, the total combined mass of magnesium chloride and/or dihydrate magnesium chloride, calcium chloride, and calcium oxide is greater than about 100 g. In one embodiment, the solid reactant mixture comprises about 16 g of magnesium chloride, about 30 g of calcium chloride, and about 20 g of calcium oxide. In some embodiments, the mixture forms part of an aqueous solution. The proportions of anhydrous magnesium chloride and/or dihydrate magnesium chloride, calcium chloride, and/or calcium oxide may be adjusted according to the teachings herein to heat the aqueous solution sufficiently to produce steam.

III. Methods of Heating a Substance in a Chamber

A method of heating a substance in a chamber (e.g., the heating chamber) can include contacting an aqueous solution with a solid chemical reactant mixture to form a heating mixture, which may be a solution (e.g., solubilizing the solid chemical reactant mixture with the aqueous solution). As described above, the heating mixture makes contact with the walls of the heating chamber. The solid chemical reactant mixture can include a first chemical reactant, a second chemical reactant, and a third chemical reactant. The first chemical reactant is allowed to sufficiently exothermically react with the aqueous solution to heat the heating solution to within a first, elevated temperature range. The second chemical reactant is allowed to sufficiently exothermically react with the aqueous solution to maintain a second temperature range, which may be the same as or different than the first temperature range. The third chemical reactant is allowed to sufficiently exothermically react with the aqueous solution to maintain a third temperature range, which may be the same as or different than either or both of the first and second temperature ranges, thereby heating the substance. Typically, the third chemical reactant is allowed to sufficiently exothermically react with the aqueous solution to maintain a temperature range over a longer period of time thereby maintaining heat transfer, which may continue to heat the substance or merely inhibit cooling of the heated substance.

In some embodiments, the method further includes adjusting the elevated temperature ranges based on the heat capacity of the substance. Appropriate substances (e.g., comestible liquids and solids), elevated temperature ranges (e.g., form 200° F. to 250° F.), and various other aspects of the method are described above (e.g., various self-heating apparatus embodiments, appropriate chemical solid chemical reactant mixtures, and other aspects of the embodiments described above).

A method of heating a substance in a chamber (e.g., a heating chamber) can include contacting an aqueous solution with a solid chemical reactant mixture. The aqueous solution is allowed to react with (e.g., dissolve) the solid chemical reactant mixture thereby producing within two minutes a heating mixture having a temperature of at least 200° F. The heating mixture is in fluid contact with the chamber. Finally, the heating mixture is allowed to transfer heat to the chamber while maintaining a temperature of at least 200° F. for at least one minute within the heating mixture thereby heating the substance. In some embodiments, the temperatures the heating mixture in the reacting step and the heat transfer step are independently from 200° F. to 250° F.

In another aspect, the present invention provides a method of heating at least six ounces, preferably between 6-12 ounces, of a liquid to a temperature of at least 120° F. in a chamber (e.g., a heating chamber). The method includes contacting an aqueous solution with a solid chemical reactant mixture. The solid chemical reactant mixture has a mass of less than 100 g. The aqueous solution is allowed to react with (e.g., dissolve) the solid chemical reactant mixture thereby producing a heating mixture. The heating mixture is allowed to transfer heat to the chamber thereby heating the liquid to at least 120° F. in the chamber.

In some embodiments, the liquid is heated to at least 120° F. within five, or more preferable four, three or two minutes of contacting the aqueous solution with the solid chemical reactant mixture. The liquid may be heated to a temperature of from 130° F. to 150° F. The solid chemical reactant mixture may have a mass of less than 150 g, or less than 100 g, or less than 75 g. In some embodiments, the solid chemical reactant mixture can have a mass of 150 g or more. In some embodiments, the aqueous solution has a volume of less than 100 mL. For example, the aqueous solution can have a volume of 65.0 mL. In some embodiments, the aqueous solution can have a volume of 100 mL or more. The solid chemical reactant mixture may include magnesium chloride, calcium chloride, and calcium oxide. The magnesium chloride may be anhydrous magnesium chloride, dihydrate magnesium chloride, or a mixture thereof.

In some embodiments, the substance is heated using an embodiment of the self-heating container described above. In some embodiments of the methods and apparatuses described herein, the aqueous solution is heated sufficiently to form steam. The steam condensation on the outer walls of the chamber then provides heat to the chamber for heating a substance therein. In some embodiments, the even distribution of steam (e.g., within the reaction chamber) provides for substantially uniform heat around the chamber (e.g., heating chamber).

In some embodiments, the self-heating system is configured with thermal transfer properties configured to control the amount and rate of heat transferred to the comestible substance. In one implementation, the self-heating container is configured to transfer a least 4.2 BTU per ounce of comestible substance from the exothermic reaction in the reaction chamber to the comestible substance in the heating chamber. In some such embodiments, the container is configured to transfer a least 4.9 BTU of heat for each ounce of the comestible substance, or a least 5.5 BTU of heat for each ounce of the comestible substance from the exothermic reaction to the comestible substance.

In some embodiments of the container, at least 4.2 BTU of heat for each ounce of the comestible substance are transferred from the exothermic reaction to the comestible substance within one minute of the initiation of the exothermic reaction. In some such embodiments, at least 4.9 BTU of heat for each ounce the comestible substance or at least 5.5 BTU of heat for each ounce of the comestible substance are transferred from the exothermic reaction to the comestible substance within one minute of the initiation of the exothermic reaction.

Table 1 sets forth minimum amounts of heat generated by exothermic reactions in various embodiments of the container, where the container contains 6 ounces of water to be heated. Table 1 provides such heat quantities in British Thermal Units (BTU) for a nominal temperature change in the mass-averaged temperature the comestible substance and a given thermal efficiency of the container. Tables 2-4 are similar to Table 1 and set forth minimum amounts of heat generated by exothermic reactions in various embodiments of the container, where the container contains 8 ounces, 10 ounces, and 12 ounces of water to be heated, respectively.

TABLE 1

Minimum Heat Quantities for 8 oz. of Water (BTU)

| Nominal Temperature Change | Thermal Efficiency | | | |
|---|---|---|---|---|
| | 60% | 70% | 80% | 90% |
| 60° F. to 145° F. | 55.4 | 47.5 | 41.5 | 36.9 |
| 70° F. to 145° F. | 48.9 | 41.9 | 36.6 | 32.6 |
| 80° F. to 145° F. | 42.3 | 36.3 | 31.8 | 28.2 |

TABLE 2

Minimum Heat Quantities for 8 oz of Water (BTU)

| Nominal Temperature Change | Thermal Efficiency | | | |
|---|---|---|---|---|
| | 60% | 70% | 80% | 90% |
| 60° F. to 145° F. | 73.8 | 63.3 | 55.4 | 49.2 |
| 70° F. to 145° F. | 65.1 | 55.8 | 48.9 | 43.4 |
| 80° F. to 145° F. | 56.5 | 48.4 | 42.3 | 37.6 |

TABLE 3

Minimum Heat Quantities for 10 oz of Water (BTU)

| Nominal Temperature Change | Thermal Efficiency | | | |
|---|---|---|---|---|
| | 60% | 70% | 80% | 90% |
| 60° F. to 145° F. | 92.3 | 79.1 | 69.2 | 61.5 |
| 70° F. to 145° F. | 81.4 | 69.8 | 61.1 | 54.3 |
| 80° F. to 145° F. | 70.6 | 60.5 | 52.9 | 47.1 |

TABLE 4

Minimum Heat Quantities for 12 oz of Water (BTU)

| Nominal Temperature Change | Thermal Efficiency | | | |
|---|---|---|---|---|
| | 60% | 70% | 80% | 90% |
| 60° F. to 145° F. | 110.8 | 95 | 83 | 73.8 |
| 70° F. to 145° F. | 97.8 | 83.8 | 73.2 | 65.2 |
| 80° F. to 145° F. | 84.6 | 72.6 | 63.6 | 56.4 |

In some embodiments, heat is generated by the exothermic reaction in a plurality of stages to expedite heating of the comestible substance. In some embodiments, a maximum temperature within the reaction chamber 13 is attained during a first stage of the multistage exothermic reaction. The maximum temperature within the reaction chamber 13 can be at least 212° F. in some embodiments. In some embodiments, the maximum temperature is reached in 15 seconds or less, 10 seconds or less, five seconds or less, two seconds or less, one second or less after initiation of the multistage exothermic reaction.

While a high maximum temperature is desirable to expedite heating of the comestible substance, the structure of the container can become compromised, the comestible substance may become too hot to be safely consumed, or both if the temperature within the reaction chamber 13 becomes too elevated. To inhibit elevation of the temperature within the reaction chamber 13 from becoming too elevated, one or both of the first compartment 16 and the second compartment 22 can contain material to absorb excess heat. For example, a thermoplastic material can be contained in the first compartment 16 along with one or more reactants. The thermoplastic material can be in one or more pieces and can be in granular form. The thermoplastic material can be configured to begin melting at or slightly above the desired average temperature of the heating reaction over the intended reaction period. The thermoplastic material preferably has a high enthalpy of fusion. In some embodiments, the material to absorb heat can comprise thermoplastic, wax, polymer material, or other materials or combinations thereof. For example, ethylene vinyl acetate (EVA), such as ELVAX™ sold by DuPont, may be used. The EVA preferably has a melting temperature of about 158° F., R&B softening point of about 239° F., and a viscosity of about 1,125 cps @350° F. In one example, about 6 to 10 grams of EVA was added to about 62.5 grams of chemical mixture consisting essential of about 10 to 55 parts of magnesium chloride, about 10 to 35 parts of calcium chloride, and about 10 to 20 parts of calcium oxide, which lowered the maximum temperature in the container by at least 10° F.

In some embodiments, the exothermic reaction generates steam during a least one stage. The reaction can cause steam within the reaction chamber for a period of less than one second, one second, or more than one second. In some embodiments, steam is generated by the exothermic reaction during the first stage of the multistage exothermic reaction. The steam may rapidly condense upon contact with walls of the container, for example, the inner container body 14. Condensation of steam on the walls of the container that separate the reaction chamber 13 from the heating chamber 15 can advantageously rapidly transfer heat to those walls of the container, thereby expediting transfer of heat to the comestible substance in the heating chamber 15. Steam, however, can also cause the internal pressure of the container to increase, thereby increasing the risk of the container rupturing. As such, the containers of certain preferred embodiments of the present invention are designed to withstand a higher rupture pressure. In one implementation, the container has an inner and outer container body that are connected by a double seam as described above. In another implementation, the container incorporates a seal plate, which serves not only as a barrier member as described above, but also structural reinforcement for the container. The seal plate preferably comprises a rigid, circular ring-like structure that extends annularly along the interior wall of the container. The seal plate and double seam features both provide structural reinforcement to the container so that the container is capable of withstanding higher internal pressures. In one embodiment, the container is capable of withstanding an internal pressure of between about 40-45 psi, more preferably at least 42 psi, as measured in accordance with ASTM F1140-07.

In some embodiments, the exothermic reaction produces a heating mixture within the reaction chamber 13 that has an average temperature of a least 167° F. over one minute from the initiation of the exothermic reaction. In some embodiments, the exothermic reaction produces a heating mixture within the reaction chamber 13 that has an average temperature of a least 170° F. over one minute. Table 5 sets forth minimum average temperatures of the heating mixture over a period of one minute to effect the stated nominal temperature changes within one minute for the stated coefficients of heat transfer between the exothermic reaction and the comestible substance, where the ratio of the surface area of the inner container body 14 that is contacted by the heating fluid as measured in square inches is three times greater than the volume of the comestible substance as measured in cubic inches.

TABLE 5

Minimum Average Temperature (° F.) of the Heating Mixture

| 3:1 S/V Nominal Temperature Change | Heat Transfer Coefficient (ft² · sec. · ° F.) | | | |
|---|---|---|---|---|
| | 0.0167 | 0.0278 | 0.0556 | 0.0833 |
| 60° F. to 145° F. | 293 | 234 | 190 | 175 |
| 70° F. to 145° F. | 276 | 224 | 184 | 171 |
| 80° F. to 145° F. | 258 | 213 | 179 | 167 |

The heat transfer coefficient of 0.0167 BTU/(ft²·sec·° F.) may require little or no agitation of the reaction mixture, while the heat transfer coefficient of 0.0833 BTU(ft²·sec·° F.) may require a vigorous agitation of the reactant mixture.

A reactant mixture with high boiling point would tend to improve heat transfer. An aqueous system can employ a controlled salt to water ratio to increase the boiling point of the reactant mixture. For example, in some embodiments, the solid reactant mixture can comprise a relatively large fraction of reactants that dissolve in water, such as magnesium chloride and calcium chloride, compared to reactants that do not, such as calcium oxide.

In some embodiments, the heating chamber 15 can be opened after a period of time has elapsed since the initiation of the exothermic reaction. For example, in some embodiments, the heating chamber 15 is opened approximately two minutes after initiation of the exothermic reaction. In some embodiments, the heating chamber can be opened less than two minutes after initiation of the exothermic reaction. For example, in some embodiments, the heating chamber 15 can be opened approximately 60 seconds or less after initiation of the exothermic reaction.

The comestible substance is preferably sufficiently warm to be consumed when the heating chamber 15 is opened. In some embodiments, when the heating chamber 15 is opened, the temperature of the heating mixture in the reaction chamber 13 is at least as great as the temperature of the comestible substance. In some embodiments, the temperature of the reactant mixture exceeds the temperature of the comestible substance when the heating chamber 15 is opened by no more than 30° F., no more than 25° F., or no more than 20° F. In some embodiments, it may be desirable that the temperature of the reactant mixture exceed that of the comestible substance when the heating chamber 15 is opened to thereby maintain the temperature of the comestible substance over a period of time after the heating chamber is opened. In some embodiments, the exothermic reaction may continue to produce heat for one minute, two minutes, five minutes, 10 minutes or more after the heating chamber 15 is opened to inhibit cooling of the comestible substance. However, in some embodiments, the exothermic reaction can be configured such that the temperature of the reactant mixture, the rate of heat generation by the exothermic reaction, and rate of heat transfer to the comestible substance are not sufficiently large to cause the temperature of the comestible substance to increase significantly after the heating chamber 15 is opened.

In some embodiments, wherein the solid chemical reactant mixture comprises at least two solid reactants in granular, particular, or powder form that are contained in the same compartment prior to activation of the exothermic reaction, transportation of the container may cause the reactants to settle and stratify within the chamber. In some embodiments, such stratification may adversely affect the exothermic reaction. To avoid stratification of the reactants during transportation, at least a first solid reactant and a second solid reactant can have average grain sizes that are approximately equal. In some embodiments, at least the first solid reactant and the second solid reactant have average grain sizes that differ by no more than 10%.

IV. EXAMPLES

The following examples are meant to illustrate certain embodiments, and are not intended to limit the scope of the invention.

Examples 1-4

700 grams of calcium chloride dihydrate, 200 grams of magnesium chloride anhydrous and 200 grams of calcium oxide is mixed together in a beaker with a spatula until the powders are thoroughly mixed. In a separate container a 5% solution of lactic acid in distilled water is mixed. Sixty-three grams of the 5% lactic acid was placed in a bottom enclosed compartment of a heat cup and 35 grams of the powder mix was loaded into an upper enclosed compartment. The drinking cup, which serves as a heating chamber, was filled with water. The cup was activated by pushing a button on the bottom thereby breaking the breakable partition between the bottom and upper enclosed compartments, then shaking for 30 seconds, and then letting sit. After a total of two minutes the drinking liquid was 105° F. The exact same experiment was repeated with the exception of using 45 grams of the powder and the drinking liquid in the heating compartment reached 116.2° F. Again, the experiment was repeated with 55 grams of powder and the temperature reached 0.131.8° F., and when 65 grams of powder was used the drinking liquid reached 149.3° F.

Example 5-7

In a small beaker 35 grams of calcium chloride was mixed with 10 grams of magnesium chloride and 10 grams of calcium oxide in a first enclosed compartment. The liquid cup contained 65 grams of 10% lactic acid solution in a second enclosed compartment when the cup was activated by breaking a breakable partition, whereupon the temperature reached 144.5° F. Two more drinking cups with the exact same contents were constructed and one cup reached 141.2 F and the other was 146.3° F. The heating chambers of the drinking cups in these three examples were filled with water as the medium to be heated.

Examples 8-10

In the next set of examples the bottom enclosed compartments contained a solution that was 15% lactic acid and 0.5% sodium lauryl sulfate in distilled water. The bottom enclosed compartments were filled with 65 grams of this solution. In the first example the heating chamber of the drinking cup was filled with tea, and an upper enclosed compartment contained a dry powder composed of 35 grams of calcium chloride, 10 grams of calcium oxide and 10 grams of magnesium chloride. When activated by breaking a breakable partition between the upper and bottom enclosed compartments, the temperature was 137.8° F. Another cup was made the exact same way but contained water in the heating chamber of the drinking cup and the temperature reached 143.4° F. A third cup was prepared with the same lactic acid-sodium lauryl sulfate solution in the bottom enclosed compartment, and the powder contained 38.5 grams of calcium chloride, 11 grams of magnesium chloride and 11 grams of calcium oxide. The heating chamber of the drinking cup contained apple cider and the temperature of the cider when activated was 147.4° F.

Example 11

Ten cups were prepared exactly the same way as in above Examples 8-10. The bottom enclosed compartment contained 65 grams of a 15% solution of lactic acid and a 0.5% solution of sodium lauryl sulfate. The powder in the upper enclosed compartment was 35 grams of calcium chloride, 10 grams of magnesium chloride, 10 grams calcium oxide. Five of the drinking cups were filled with apple juice in the heating chamber and the temperature upon activation ranged from 124.4° F. to 150.2° F. The other five cups were filled with tea in the heating chamber and upon activation by breaking a breakable partition between the upper and bottom enclosed compartments. The temperature ranged from 125.0° F. to 153.1° F.

Examples 12-13

Two cups were prepared as in example 11. The heating chamber drinking cup contained tea. After the samples were prepared they were placed in the freezer for 24 hours before activation. They were removed from the freezer and activated immediately by breaking the breakable partition. The tea of one reached 125.0° F. and the other reached 122.1° F.

Examples 14-15

Two cups were prepared as in example 11 and also contained tea in the heating chamber of the drinking cup. After the samples were prepared they were placed in the refrigerator for 24 hours before they were activated. Upon activation by breaking the breakable partition, the tea in one reach was 138.2° F. and the other was 142.7° F.

Examples 16-17

Again two cups were prepared as in example 11 and also contained tea in the heating chamber of the drinking cup. After the samples were prepared they were placed on a shaking table for 24 hours to simulate shipping conditions. Upon activation by breaking the breakable partition, the tea in one cup reached 153° F. and the other was 160° F.

Examples 18-21

In these four examples the powder was 35 grams of calcium chloride, 10 grams of magnesium chloride, and 10 grams of calcium oxide. The heating chamber of the drinking cup contained tea in all four examples. In the bottom enclosed compartment the lactic acid was replaced with 15% acetic acid in one case, 15% oxalic acid in one case, 15% gluconic acid in another case and 15% propionic acid in the last case. They all contained 0.5% sodium lauryl sulfate. Upon activation by breaking the breakable partition, the tea in the acetic acid cup reached 122.0° F., the oxalic cup 132.6° F., the gluconic acid cup 126.0° F. and the propionic cup reached 130.5° F.

Examples 22-25

In these two examples technical grade calcium oxide instead of reagent grade calcium oxide was used. The heating chamber of the drinking cup contained tea and the temperatures of the tea in the heating chamber reached in 143.6° F. and 143.4. From this experiment it was determined that the calcium oxide could be purchased using a lower grade rather than reagent grade calcium oxide. In another test the heating compartment was filled with juice instead of tea and the temperature reached 141.4° F. and 139.0° F.

Examples 26-31

In the following examples the dry powders were not mixed. They were layered in the enclosed chambers to determine whether mixing the chemicals affects performance. The dry powders in this experiment were 38.5 grams of calcium chloride, 11 grams of magnesium chloride and 11 grams of calcium oxide. The bottom enclosed compartment contained the 15% lactic acid and 0.5% sodium lauryl sulfate solution and the heating chamber of the drinking cup contained water. See Table 1 for the results.

TABLE 6

| Cup Number | First Layer | Second Layer | Third Layer | H₂O Temp. |
|---|---|---|---|---|
| 1 | Calcium Oxide | Calcium Chloride | Magnesium Chloride | 141.5 F. |
| 2 | Calcium Chloride | Magnesium Chloride | Calcium Oxide | 148.0 F. |
| 3 | Magnesium Chloride | Calcium Oxide | Calcium Chloride | 129.0 F. |
| 4 | Magnesium Chloride | Calcium Chloride | Calcium Oxide | 131.5 F. |
| 5 | Calcium Chloride | Calcium Oxide | Magnesium Chloride | 143.0 F. |
| 6 | Calcium Oxide | Magnesium Chloride | Calcium Chloride | 133.5 F. |

Example 31-34

In these examples the dry chemicals were ground in a mill. The dry mix contained 38.5 grams of calcium chloride, 11 grams of magnesium chloride, and 11 grams of calcium oxide. In the first cup the heating chamber of the drinking cup contained water and upon activation by breaking a breakable partition the temperature of the water was 145.0° F. In the second cup the heating chamber of the drinking cup contained juice and the temperature was 139.6° F. The other two cups contained tea and one reached a 143.2° F. and the other was 136.6° F.

In the next eleven examples the dry chemicals were all ground in a grinder and dried in the oven. The mix contained 38.5 grams of calcium chloride, 13.0 grams of magnesium chloride and 11.0 grams calcium oxide. The bottom enclosed containers contained the 15% lactic acid with 0.5% sodium lauryl sulfate solution. Six cups contained tea and upon activation by breaking a breakable partition the temperature of the water in the heating chamber ranged from 126.7° F. to 139.1° F. In the other five cups the temperatures ranged from 136.8° F. to 143.6° F.

Example 46-47

In these examples the bottom enclosed container contained 20% lactic acid and 0.5% sodium lauryl sulfate solution and the heating chamber of the drinking cup contained water but the dry chemicals only contained 30 grams of calcium chloride and 28 grams of calcium oxide. The temperature upon activation was 141.0° F. A second cup contained 25 grams of calcium chloride and 25 grams of calcium oxide and the water temperature upon activation was 135° F.

Examples 48-49

In these examples the bottom enclosed container contained 20% lactic acid and 0.5% sodium lauryl sulfate solution and the heating chamber of the drinking cup contained water and the dry chemicals mix contained 35 grams of calcium chloride and 18 grams of calcium oxide and 2 grams of magnesium chloride. The temperature of the water upon activation was 140.5° F. and 138.0° F.

Example 50-59

In these nine examples the bottom enclosed container contained the 15% lactic acid solution with the 0.5% sodium lauryl sulfate and the dry powder was ground and placed in the oven. The dry mix contained 35 grams of calcium chloride, 15 grams of magnesium chloride and 15 grams of calcium oxide. All the heating chambers of the drinking cups contained water and the temperature ranged between 130.6° F. and 144.0° F. in all nine cups upon activation.

Example 60

Ten self-heating containers constructed with the double seam and seal plate as described above were tested for internal pressure failure point in accordance with ASTM Method F1140-07 "Standard Test Methods for Internal Pressurization Failure Resistance of Unrestrained Packages". See Table 7 for results.

| Cup Number | Micrometer Measurements | Psi at Rupture |
| --- | --- | --- |
| 1 | 0.098, 0.099, 0.098 | 45 |
| 2 | 0.098, 0.100, 0.100 | 45 |
| 3 | 0.098, 0.098, 0.099 | 45 |
| 4 | 0.098, 0.097, 0.099 | 45 |
| 5 | 0.101, 0.102, 0.100 | 45 |
| 6 | 0.104, 0.104, 0.105 | 46 |
| 7 | 0.097, 0.098, 0.099 | 42 |
| 8 | 0.098, 0.097, 0.100 | 43 |
| 9 | 0.098, 0.097, 0.098 | 43 |
| 10 | 0.100, 0.101, 0.102 | 40 |

Although the inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of the inventions, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the embodiments of the present inventions herein described should not be limited by the particular disclosed embodiments described herein.

What is claimed is:

1. A container for a comestible substance, comprising:
   an inner container body forming a receptacle to receive the comestible substance;
   an outer container body attached to the inner container body forming a chamber between the outer container body and the inner container body;
   a barrier disposed within the chamber, the barrier at least partially separating a first compartment of the chamber from a second compartment of the chamber, the barrier comprising a first barrier member and a second barrier member, the first barrier member being removably mechanically coupled to the second barrier member; and
   an actuator that is configured to engage the second barrier member to decouple the second barrier member from the first barrier member and permit one of the first reactant and the second reactant to move between the first compartment and the second compartment, the actuator comprising a wall extending towards the barrier, the wall configured to inhibit tilting of said second barrier during an uncoupling of the first and second barrier members.

2. The container of claim 1, wherein the second barrier member comprises a seal plate.

3. The container of claim 2, wherein the seal plate extends across an interior cross-section area of the outer container so as to provide structural reinforcement for the container.

4. The container of claim 3, wherein the container is capable of withstanding an internal pressure of at least 17 psig.

5. The container of claim 1, wherein the inner container body and the outer container body are coupled together by a double seam.

6. A container adapted to change the temperature of a comestible substance contained therein, comprising:
   an outer body, said outer body comprising a plurality of sidewalls which together define a recess;
   a receptacle adapted to store the comestible substance, said receptacle is disposed in the recess and coupled to the outer body to form a chamber between the receptacle and the outer body, wherein at least a portion of the chamber substantially surrounds the receptacle;
   a barrier positioned within the chamber to divide the chamber into a first and a second compartment, wherein each compartment is adapted to receive one or more chemical reactant, the barrier comprising a stationary barrier member and a movable barrier member, the stationary barrier member being substantially fixed relative to the outer body, said stationary barrier member having a fixed sized opening, said movable barrier member being removably attached to the stationary barrier member and adapted to seal the opening;
   an extension coupled between said movable barrier layer and a preselected area on the container, wherein the extension comprises at least one fin;
   wherein when a predetermined threshold force is applied to the preselected area on the container, the extension is translated so that the movable barrier member separates from the stationary barrier member in a manner such that the movable barrier member is completely detached from the stationary barrier member, resulting in the entire fixed sized opening being uncovered, thus allowing one or more chemical reactants to flow from one chamber to the other at a predictable rate, wherein pressure from the out-flowing chemical reactants pushes the movable barrier member away from the opening to substantially inhibit the movable barrier member from blocking portions of the opening; and
   wherein a reaction involving the chemical reactants causes the temperature of the comestible substance to change.

7. The container of claim 6, further comprising a movable portion, wherein the movable portion is movable between a first position and a second position, the movable portion being spaced from the movable barrier member when the movable barrier member and the stationary barrier member are attached and the movable portion is in the first position, the movable barrier member being completely detached from the stationary barrier member when the movable portion is in the second position.

8. The container of claim 7, wherein the movable portion causes the movable barrier member to detach from the stationary barrier member when the movable portion is at a position between the first position and the second position.

9. The container of claim 6, wherein the stationary barrier member and the movable barrier member are attached to each other by friction.

10. The container of claim 9, wherein movement of the movable barrier member away from the stationary barrier member is inhibited by mechanical interference between at least a portion of the movable barrier member and at least a portion of the stationary barrier member.

11. The container of claim 10, wherein a first radially protruding ring of the movable barrier member mechanically interferes a second radially protruding ring of the stationary barrier member.

12. The container of claim 11, wherein at least one of the first radial protruding ring and the second radially protruding ring is continuous.

13. The container of claim 12, wherein at least one of the first barrier member and the second barrier member comprises at least one wall that is positioned to inhibit relative movement of the first radially protruding ring and the second radially protruding ring.

14. The container of claim 6, wherein the stationary barrier member and the movable barrier member form a snap cap assembly.

15. The container of claim 6, wherein the predetermined threshold force is at least about 2 lbs.

16. The container of claim 6, wherein the opening is sufficiently large to allow at least one of the chemical reactants to pass through the opening in less than one second.

17. The container of claim 6, wherein the preselected area on the container comprises a wall at least partially surrounding the extension, the wall configured to inhibit tilting of said movable barrier during separation the barrier members.

18. The container of claim 6, wherein the extension comprises a plurality of fins.

19. The container of claim 6, wherein the temperature changes to at least 170° F.

20. The container of claim 6, wherein the at least one fin is configured to direct chemical reactions through said opening.

* * * * *